US006557024B1

(12) United States Patent
Saito et al.

(10) Patent No.: US 6,557,024 B1
(45) Date of Patent: Apr. 29, 2003

(54) DISTRIBUTED FILE PROCESSING WITH CONTEXT UNIT CONFIGURED TO JUDGE THE VALIDITY OF THE PROCESS RESULT ON THE BASIS OF THE NAME OF THE RAW FILE AND THE NAME OF THE EXECUTED PROCEDURE

(75) Inventors: Jun Saito, Nakai-machi (JP); Shigehisa Kawabe, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/382,952

(22) Filed: Aug. 25, 1999

(30) Foreign Application Priority Data

Sep. 3, 1998 (JP) .......................................... 10-249235

(51) Int. Cl.[7] .............................................. G06F 15/16
(52) U.S. Cl. ...................... 709/201; 709/203; 709/223; 709/226; 707/10
(58) Field of Search ................................ 709/201, 203, 709/220, 223, 226; 707/10

(56) References Cited

U.S. PATENT DOCUMENTS

| | | | | |
|---|---|---|---|---|
| 5,418,954 A | * | 5/1995 | Petrus | 709/331 |
| 5,765,154 A | * | 6/1998 | Horikiri et al. | 707/10 |
| 5,944,793 A | * | 8/1999 | Islam et al. | 709/220 |
| 5,968,127 A | * | 10/1999 | Kawabe et al. | 709/226 |
| 6,058,423 A | * | 5/2000 | Factor | 709/226 |
| 6,272,523 B1 | * | 8/2001 | Factor | 709/201 |

FOREIGN PATENT DOCUMENTS

JP A-8-292910 11/1996

OTHER PUBLICATIONS

Wessels, D. et al, "Application of Internet Cache Protocol (ICP), version 2," National Laboratory for Applied Network Research/UCSD, Sep. 1997, pp. 1–24.

* cited by examiner

Primary Examiner—Nabil El-Hady
(74) Attorney, Agent, or Firm—Oliff & Berridge, PLC

(57) ABSTRACT

The present invention provides the device and method of processing distributed files whereby the load to file servers and communication traffic on the paths is reduced by effectively utilizing duplicates. The distributed file processor of the present invention comprises a context unit that processes a raw material file based on the virtual URL configured by qualifying a raw material file name with a procedure name, etc., representing a procedure to edit and process a raw material, a result holding unit that holds a process result of the raw material file processed by the context unit, and a result control unit that judges the validity of the process result held by the result holding unit. The result control unit judges the validity of the process result based on the raw material file name and procedure name corresponding to the process result, a process execution date and time of a procedure process, and a process request identifier inherent to a request that demanded to execute the procedure process, etc.

14 Claims, 24 Drawing Sheets

DISTRIBUTED FILE PROCESSING WITH CONTEXT UNIT CONFIGURED TO JUDGE THE VALIDITY OF THE PROCESS RESULT ON THE BASIS OF THE NAME OF THE RAW FILE AND THE NAME OF THE EXECUTED PROCEDURE

BACKGROUND OF THE INVENTION

1. Field of Invention

The present invention on relates to a distributed file processor and distributed file processing method. In detail, the present invention relates to a device and method of processing distributed files, which enables users to gain efficient access to distributed data that exists in, for example, network servers through a data communication network with plural computers connected, and also to extract processing data quickly.

2. Description of the Related Art

Recently, in the field of the distributed file access system through a network, demands for higher speed and accuracy have been increasing. Various distributed file processing systems have been proposed and tested. The following are explanations of some of the typical systems.

Related Art 1

As one of the general conventional distributed file access systems, there is a system with which a client gains access to a file through a proxy server or relay server (hereinafter called proxy server), distributed a long a network path connecting a file server that provides files and a client server that accesses the files. The FTP mirror server is one such example.

Such a system using a proxy server has an advantage that lowers the load on the file server and reduces communication traffic on the network path by providing duplicates of the file in advance.

Also, the snapshot system has been devised which provides a duplicated file to subsequent access by dynamically creating the duplicate of a file accessed by a client, without having the duplicated file accommodated in the server beforehand. For example, Squid, the HTTP relay server program mentioned in RFC2187 executes updating and nullifying of a duplicate when it judges that they are necessary, by a calculation based on the time stamp information such as the generation time of a duplicate or the original file.

In this type of the snapshot system, the management of a file duplicate, for example, is implemented in the following procedure. First, when a client requests access to a file, and a duplicate of the requested file exists in the proxy server, the calculation based on the time stamp information mentioned above is executed, and the freshness of the duplicate, is judged. Other than when the duplicate is adequately fresh, the original time stamp of the requested file and that of the duplicate are compared, and if the duplicate is fresher, the program returns the duplicate. If the duplicate is older, it is nullified, and the original file is copied again to create and return a new duplicate. In this sort of method creating duplicates dynamically, the management of duplicates can be automated and hence the management cost can be reduced, and the expansion of proxy servers becomes easier, compared to the system which accommodates duplicates beforehand.

However, a file created in on-demand type on a file server at the time of access, represented by CGI of WWW, (for example, when including today's weather into information of a file), the time stamp information is added when it is accessed. With a system which manages duplicates by only the time stamp information, the validity of a duplicate cannot be judged because there is not a mechanism to decide an appropriate time stamp that compares the duplicate and the original. Therefore, it is difficult to efficiently utilize duplicates as for the files that are created dynamically.

This kind of technique will be hereinafter called the Related Art 1.

Related Art 2

In the Japanese Published Unexamined Patent Application No. Hei 8-292910 are disclosed a resource management device and the method of the same that interpret a resource name qualified and configured by the resource name of a raw material, a procedure name representing a procedure to process the raw material, a parameter corresponding to the procedure, and a contextual identifier representing the device that interprets the procedure name and starts the procedure, execute access to the resource name of a raw material, start the procedure, and process the resource name of a raw material.

This resource management device and the method disclosed in the Japanese Published Unexamined Patent Application No. Hei 8-292910 resolute to decentralize the procedure name and raw material resource name embedded in the resource name, and combine the procedures like a pipeline on the network. However, there is a flaw of being unable to acquire the combined resources which is the fruit of the final process, when a part of communication fails by a communication error such as a burst on a network, considering that a procedure can be combined in multiple steps or if it has multiple entries, the pipeline will be made up in like a tree configuration. When communication fails and does not generate a result, the result could be acquired by a rerun. But to acquire one combined resource, plural times of network communication are required. Accordingly, on a network with low reliability, there is a high probability of failing in any of the communication which would require repeating numbers of rerun until acquisition of the result, or even not being able to acquire the combined resource at all.

This kind of technique will hereinafter be called the Related Art 2.

To consider visualizing the reduction of load to file servers and communication traffic on the network path by effectively utilizing created duplicates in the distributed file processing, the construction of the conventional techniques mentioned-above could cause problems explained below.

First, in the Related Art 1, there is a difficulty in handling duplicates for documents generated dynamically on the server at the request of a client, though it provides some effects such as reducing the communication traffic utilizing the duplicate at times of access of WWW mentioned above.

Also, the Related Art 2 achieves the distributed file processing by means of the procedure of distributed file access, and will be able to provide a service combining various kinds of processes, but since the result of process requires the multiple combinations of pipelines, there is a high probability of failure on an unreliable network, and also the problem of low practicability.

The present invention has been made in view of these problems that the foregoing conventional techniques hold, and it is an object of the present invention to reduce the load to file servers and communication traffic on the paths by effectively utilizing duplicates of the files.

SUMMARY OF THE INVENTION

In order to accomplish the foregoing object, the distributed file processor in a distributed computer system with computers connected through a network relating to the present invention comprises: a context unit that interprets a qualified file name configured by qualifying a raw material file name identifiable of a data file raw material held in the processor connected to the network with a procedure name representing a procedure to edit and process the raw material, a parameter of the procedure, the name of a computer that interprets the procedure name and operates the procedure, and a context name that defines operational environments, fetches the raw material file name and the procedure name, inputs data of a raw material file corresponding to the fetched raw material file name, starts a procedure corresponding to the fetched procedure name, and implements a process by the procedure having started the raw material file; a process result holding unit that holds a process result of the raw material file processed by the procedure started by the context unit; a result outputting unit that outputs to fetch the process result held by the process result holding unit; and a process result control unit that judges the validity of the process result held by the process result holding unit.

Further, in the distributed file processor of the present invention, the process result control unit comprises a configuration that judges the validity of the process result on the basis of the raw material file name corresponding to the process result held by the process result holding unit and the procedure name executed in the context unit.

Further, in the distributed file processor of the present invention, the process result control unit comprises a configuration that judges the validity of the process result on the basis of either a process execution date and time of the procedure process by the context unit, or a process request identifier inherent to a request that demanded to execute the procedure process by the context unit.

Further, in the distributed file processor of the present invention, the process result control unit comprises a configuration that compares an updating date and time of the raw material file with a process execution date and time of the procedure process by the context unit, and judges the validity of the process result on the basis of the comparison result.

Further, in the distributed file processor of the present invention, when the context unit judges that a process time specifier of the requested process result is included in the interpretation of the qualified file name, the process result control unit comprises a configuration that judges the validity of the process result associated with the process date and time based on whether or not the process date and time corresponds to a rage of time indicated by the process time specifier.

Further, in the distributed file processor of the present invention, the network comprises a configuration that connects a plurality of context units, a plurality of process result holding units provided correspondingly to the plurality of context units, and a plurality of process result control units provided correspondingly to the plurality of process result holding units, in which a plurality of the context units are each capable of the procedure process individually, and a first process result control unit that judges the validity of the process result corresponding to a process request outputted on the network comprises a configuration that executes a query as for the validity of the process result to a second process result control unit that controls a second process result holding unit on the network which holds the process result corresponding to the raw material file and the procedure specified by the process request.

Further, in the distributed file processor of the present invention, the process result control unit comprises a configuration that executes a process of either invalidation or cancellation of the process result stored in the process result holding unit, on the condition of the analysis that a specific parameter indicating a designation of either invalidation or cancellation of the process result held in the process result holding unit is included in the interpretation of the qualified file name by the context unit.

Further, in the distributed file processor of the present invention, accompanied with the execution of a process by the process result control unit, which relates to either invalidation or cancellation of the process result stored in the process result holding unit, the context unit comprises a configuration that acquires the raw material file corresponding to the process result in which the invalidation or cancellation has been executed, and executes a new process to hold a process result thereof in the process result holding unit.

Further, in the distributed file processor of the present invention, a process according to the procedure to the raw material file in the context unit is executed as an asynchronous process independent from a timing of a process request, a process result identifier is generated to a process result processed by the procedure, which corresponds to the process result, and the process result identifier is held in the process result holding unit to be associated with the process result.

Further, in the distributed file processor of the present invention, the context unit comprises a configuration that executes the procedure to the raw material file as an asynchronous process independent from the timing of a process request, on the condition of the judgment that specifying data indicating the process request being asynchronous is included in the interpretation of the qualified file name.

Further, in the distributed file processor of the present invention, when the context unit judges that a process result that does not completely coincide but partially coincides with a condition of a process request is included in the process result holding unit in the interpretation of the qualified file name, the result output unit comprises a configuration that outputs the process result having the partial coincidence included in the process result holding unit.

And, the distributed file processing method in a distributed computer system with computers connected through a network relating to the present invention comprises: a procedure processing step by a context unit that interprets a qualified file name configured by qualifying a raw material file name identifiable of a data file raw material held in the processor connected to the network with a procedure name representing a procedure to edit and process the raw material, a parameter of the procedure, the name of a computer that interprets the procedure name and operates the procedure, and a context name that defines operational environments, fetches the raw material file name and the procedure name, inputs data of a raw material file corresponding to the fetched raw material file name, starts a procedure corresponding to the fetched procedure name, and implements a process by the procedure having started the raw material file; a result holding step that holds in the process result holding unit a process result of the raw material file processed by the procedure started in the procedure processing step; a process result validity judgment step that judges the validity of the process result held by the process result holding unit; and a result outputting step that outputs to fetch the process result held by the process result holding unit, which is the process result that is judged as valid in the process result validity judgment step.

Further, in the distributed file processing method of the present invention, the process result validity judgment step judges the validity of the process result on the basis of the raw material file name corresponding to the process result held by the process result holding unit and the procedure name executed in the context unit.

Further, in the distributed file processing method of the present invention, the process result validity judgment step judges the validity of the process result on the basis of either a process execution date and time of the procedure process by the context unit, or a process request identifier inherent to a request that demanded to execute the procedure process by the context unit.

Further, in the distributed file processing method of the present invention, the process result validity judgment step compares an updating date and time of the raw material file with a process execution date and time of the procedure process by the context unit, and judges the validity of the process result on the basis of the comparison result.

Further, in the distributed file processing method of the present invention, a procedure process in the context unit to the raw material file is executed as an asynchronous process independent from the timing of a process request, a process result identifier is generated to a process result processed by the procedure, which corresponds to the process result, and the process result identifier is held in the process result holding unit to be associated with the process result.

DETAILED DESCRIPTION OF THE PREFERRED EMBODIMENTS

Figure 1:
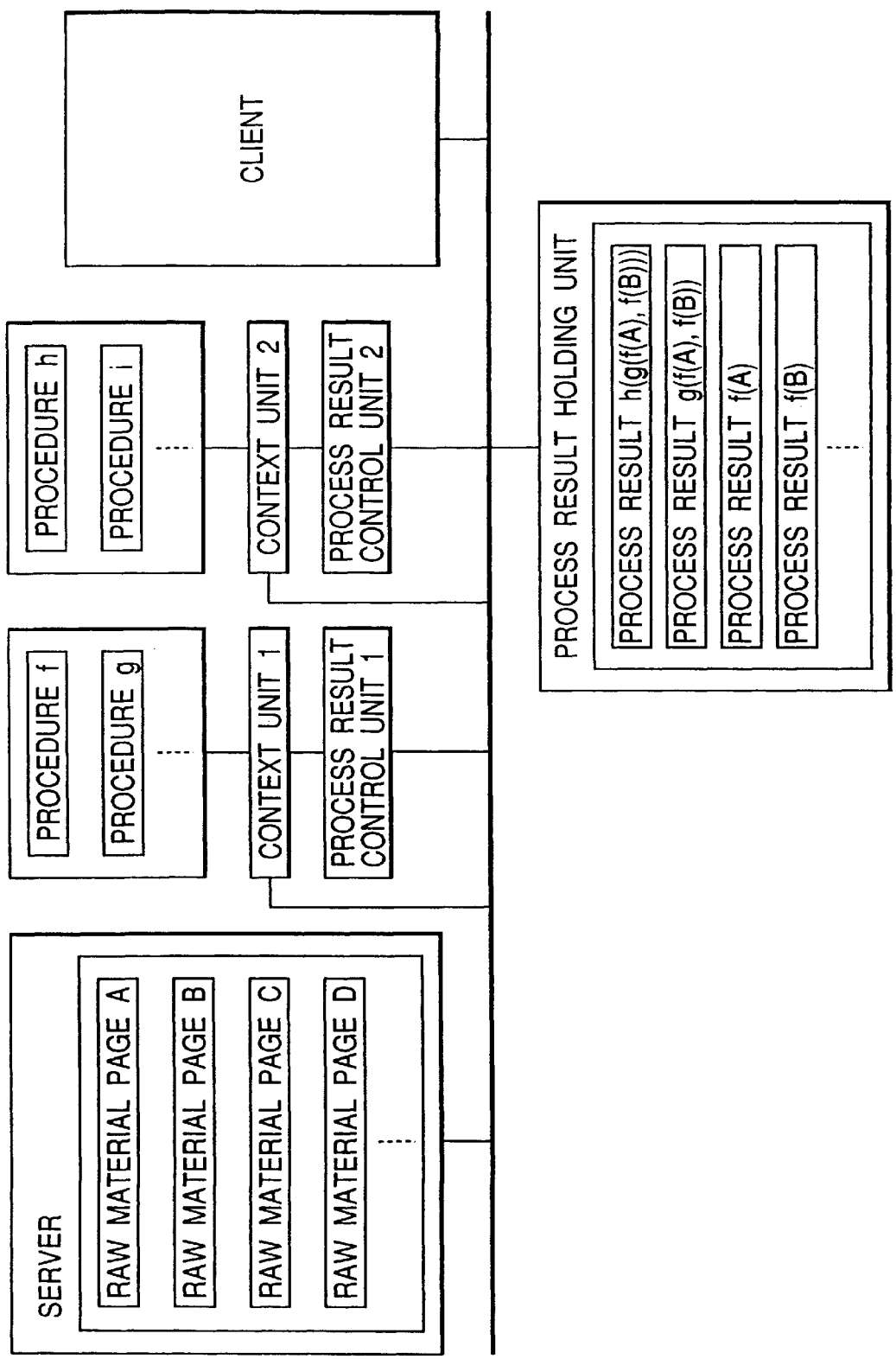
FIG. 1 is a chart to illustrate a network configuration to which the distributed file processor relating to the present invention is applied.

FIG. 1 illustrates the outline of the main entities of a network configuring the distributed file processing system of the present invention. As shown in FIG. 1, a client (at the right end of FIG. 1) being the execution entity to access files, and a server (at the left end of FIG. 1) being the supply entity of the files which holds the raw material pages A, B, C . . . are connected to the network. Furthermore, the system of the present invention possesses processing servers that process the raw material pages A, B, C . . . held in the server in various forms and also have various kinds of capabilities such as holding the processed results. These are shown in FIG. 1 as a context unit, processed result holding unit, etc. Configuration and capabilities of these processing servers will be detailed in the following embodiments;

The outline of the process in the basic configuration of the present invention illustrated in FIG. 1 will be described briefly. First, an user on the network requests processed data of a specific file through a WWW client. The raw material file of the requested file is basically held in a WWW server as raw material pages A, B, C . . . The user requests the output of the data processed in various forms to these raw material files. For example, the user requests to extract a part of an HTML document corresponding to the raw material page A to output as a summarized HTML document (summarizing method), or to merge a plurality of HTML documents into a single HTML document as the output (merging method). These manipulation processes are one form of the procedures f, g, h . . . shown in FIG. 1.

The f (A), f (B), etc. held by a process result holding unit shown in FIG. 1 are the result data acquired by implementing a predetermined process to the raw material pages A and B. There are a case when the process result holding unit holds the data processed in accordance with the request of the WWW client, and a case when it does not. Also, there is a case when the manipulated data, for example, f (A) is held, but at the time of user access, the raw material page A which was the origin of manipulated file is already updated and held as updated version of raw material page A' in the WWW server. The system of the present invention is the one that can flexibly accommodate the requests from the WWW client in such various cases, and the detailed description will be given in the following embodiment.

Embodiment 1

Figure 2:
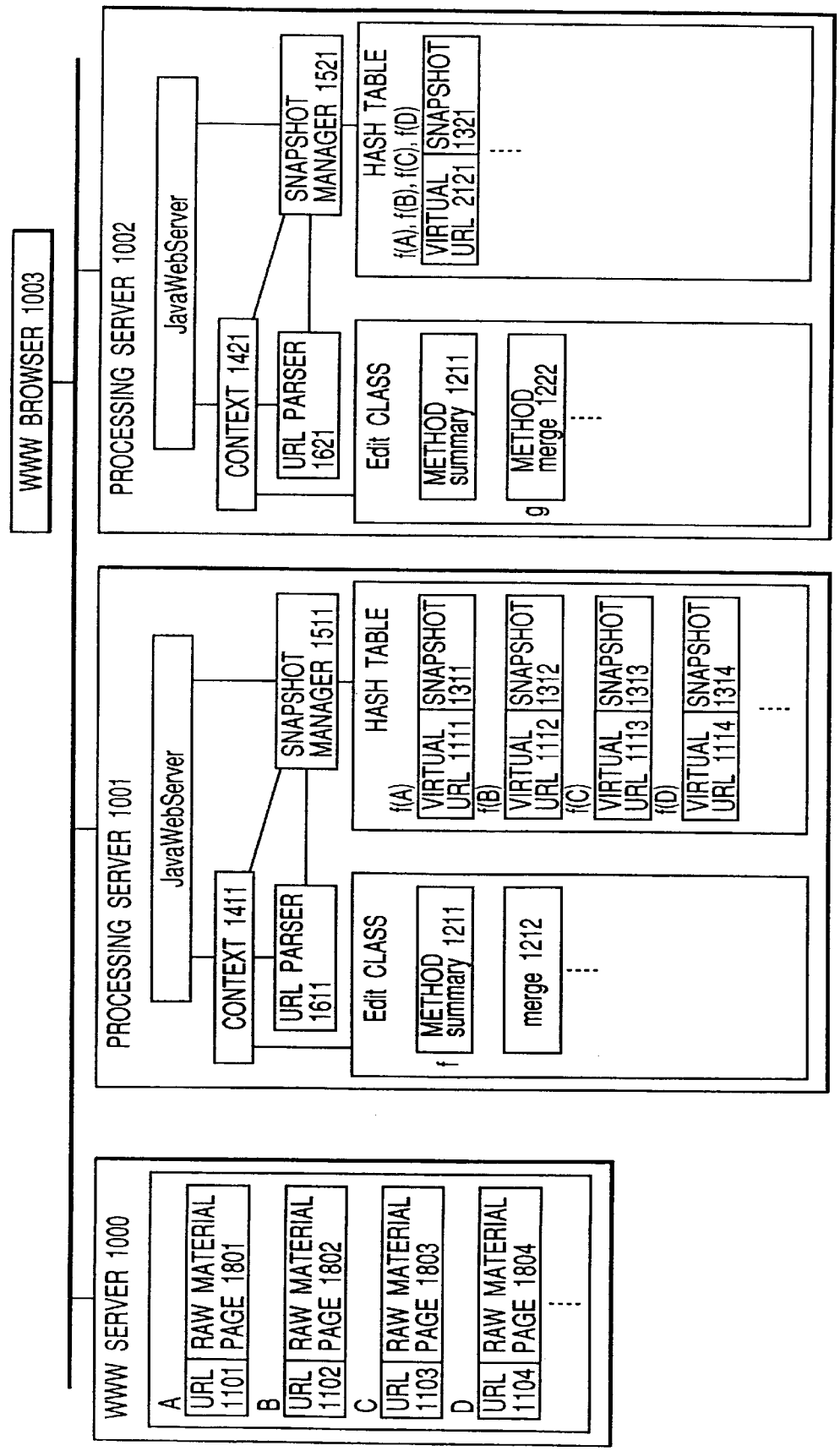
FIG. 2 is a chart to illustrate a detailed configuration of Embodiment 1 in the distributed file processor relating to the present invention.

First, the first embodiment of the distributed file processor according to the present invention will be described. FIG. 2 illustrates a configuration block of the distributed file processor discussed in the Embodiment 1.

With reference to FIG. 2, the network connects a WWW server 1000 that holds raw material files, processing servers 1001 and 1002 that execute contexts and various kinds of procedures, and a WWW browser 1003 that outputs the file request to each other. FIG. 2 shows an example of two processing servers connected to the network, but the number of processing servers, WWW servers, and WWW browser that can be connected is arbitrary.

The WWW server 1000 holds a raw material file 1801 whose URL is, for example, http://host0/page01.html, and this URL will be named URL 1101. The WWW server also holds other raw material pages like 1802, 1803, 1804 . . . So the corresponding URLs will be called URL 1102, URL 1103, URL 1104. . .

The processing servers 1001 and 1002 (JWS: Java Web Server) hold Edits which are a class of Java, method summaries 1211, 1221 being the methods for the Edit class as a method, and merges 1212, 1222, etc.

In this embodiment, with reference to FIG. 2, the file server is the WWW server 1000, and the file is the WWW page described in HTML format. The WWW server 1000 and its client WWW browser 1003 sends and receives WWW pages through the network with HTTP (HyperText Transfer Protocol). The file name is URL, and it is usually written as, for example, http://host1/index.html.

The syntax for URL is defined in RFC1738.

For example, if the host name of the processing server 1001 is host 1, and the port number is 8080, the WWW browser 1003 can send a request with a virtual URL 1111 described below, which is made by qualifying raw material file name URL 1101 with the procedure name, the parameter, and the computer name, etc.

http://host1:8080/context/Edit?method=summary&url1= ht tp%3A%2Fhost0%2Fpage01.html The detailed description for the virtual URL will be given below.

Detailed description of the Embodiment 1 will be given below in the order of:
1. Virtual URL
2. The outline of each entity (refer to FIG. 2)
3. The operation of the processing server (refer to FIG. 3)
4. The operation of the context (refer to FIG. 4)
5. The operation of the URL parser (refer to FIG. 5)
6. The operation of the snapshot manager (refer to FIG. 6 and FIG. 7)
7. The process during response
1. Virtual URL First, a detailed description of the virtual URL will be given. A file name configured by qualifying the raw material file name with the procedure name, parameter, and computer name is realized as the "Virtual URL" configured by qualifying the "URL" with the procedure name, parameter, and computer name. The virtual URL for example, is described as below.

http://host1:8080/context/Edit?method=summary&url1= ht tp%3A%2F%2Fhost0%2Fpage01.html At the leading part of the virtual URL are a protocol of the file access, host name of the server where the context exists, TCP port number, and a path name which gives the order of starting the context. This syntax is the same as those for the ordinary URL.

For example, if the protocol is HTTP, the host name host 1, port number 8080, and the path name context/, the leading part of the virtual URL will be http://host1:8080/context/, and the following description will specify the context and the procedure.

In this embodiment, the context will be realized as an object program described by the Java language, and specified by the class name.

The procedure is a method described by the Java, and is specified by the above mentioned class name and method name. The method name is included in the virtual URL in the following format. The leading part starts with ?, and is in a format where the character string <propertyName>= <propertyValue> is delimited and linked by the character &, and the propertyName is a name for identifying the kind of value described as the propertyvalue.

The method name is specified by the character string following method=.

For example, if the class name is Edit, and the method name is summary, then Edit?method=summary.

The parameter and the URL of the raw material are also described in the format, <propertyName>=<propertyValue>, and added after the method name with & as a delimiter. Also, in this format, the symbols /, &, ?,: , =in the method name, parameter, and URL of the raw material are translated into %2F, %26, %3F, %3A, and %3D.

For example, if the URL of the file is shown as http://host0/page01.html, it will be translated into &url1= http%3A%2F%2Fhost0%2Fpage01.html to describe it in the virtual URL.

Figure 5:
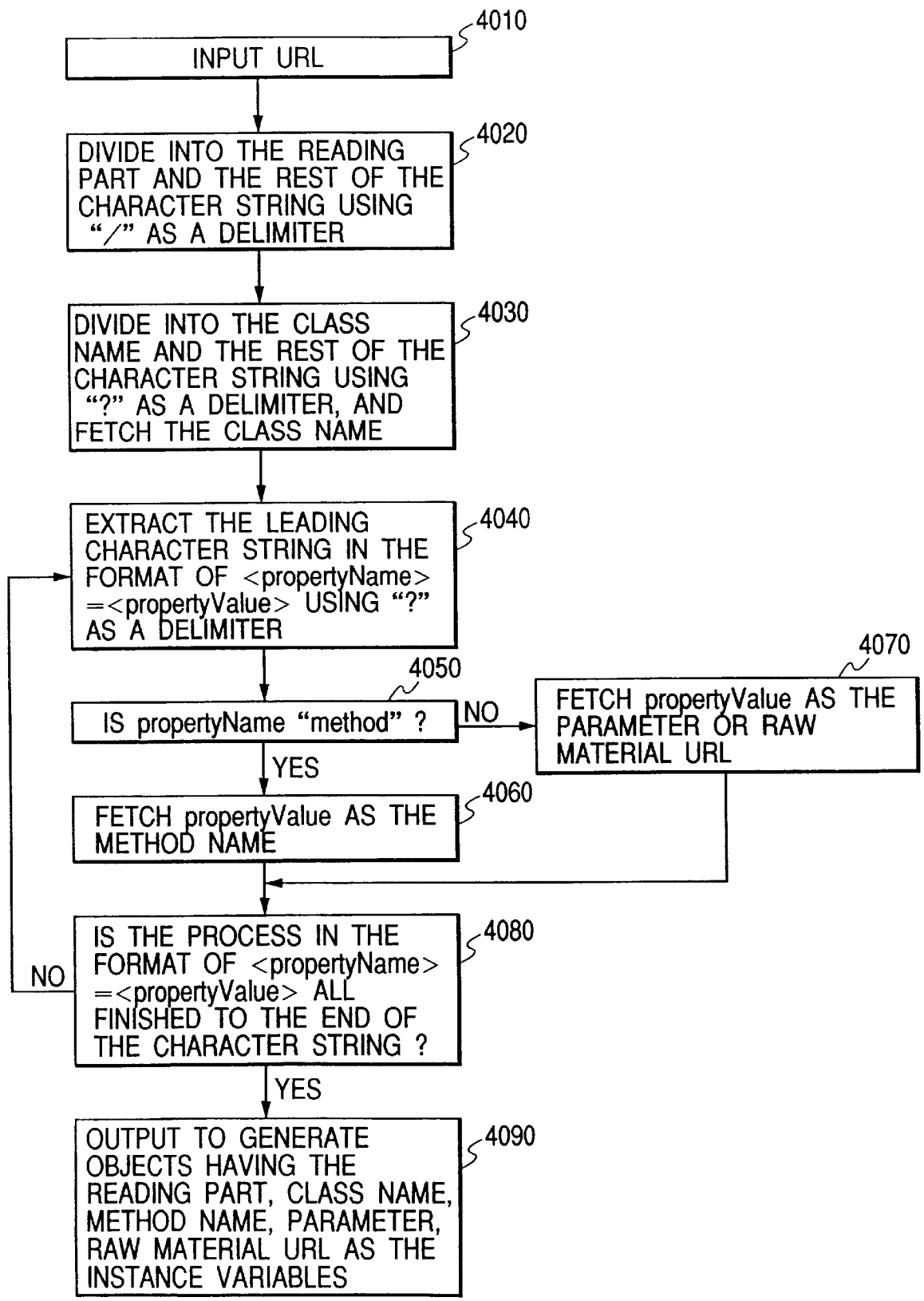
FIG. 5 is a chart to illustrate the operational flow of the URL parser in Embodiment 1 of the distributed file processor relating to the present invention.

The detailed description on the operation of the URL parsers 1161 and 1162 that analyze the virtual URL described as such will be given later with reference to FIG. 5.

Also, the following explanation will be given with descriptions of the virtual URL, etc., translated into mnemonic symbols by the abbreviation rule to avoid the redundancy. The virtual URL, etc., will be associated with each of the mnemonic symbols as follows.

First, the server name, port name, context, class name, and method name are expressed using the lower case letters.

f: the method "summary" of the class Edit which is started by the context that can be accessed by the WWW server of the port 8080 in the host 1 will be called "f". p1 g: the method "merge" of the class Edit which is started by the context that can be accessed by the WWW server of the port 8080 in the host 2 will be called "g".

Next, the URL (including the virtual URL) is expressed with the upper case letters. For example, A: "http://host0/page01.html" is expressed as "A".
B: "http://host0/page02.html" is expressed as "B".
X:
  "http://host1:8080/context/Edit?method= summary&url1=http%3A% 2F%2Fhost0%2Fpage01.html" is expressed as "X".
Y:
  "http://host1:8080/context/Edit?method= summary&url1=http%3A% 2F%2Fhost0%2Fpage02.html." is expressed as "Y".
Z:
  "http://host2:8080/context/Edit?method=merge&url1= http%3A%2F%2F host1%3A8080%2Fcontext%2FEdit%3Fmethod%- 3Dsummary%26url1%3Dht tp%253A%252F%252Fhost0%252Fpage01.html&- url2=http%3A%2F%2Fhost1%3A8080%2- Fcontext%2FEdit%3Fmethod%3Dsummary%26- url1%3Dhttp% 253A%252F%252Fhost0%252Fpage02.html" is expressed as "Z".

Also, the description that indicates the URL as a raw material for the procedure, namely, the structure configuring the virtual URL by qualifying the URL, is expressed in the same manner as the transcription rule of a function as follows.

For example, by using the above mentioned A, B, X, Y, Z, f, g,

X is expressed as f (A),
Y as f (B),
Z as g (X,Y), or g (f (A), f (B)).

2. The Outline of Each Entity

Next, the outline of each entity of the processing server which configures the present embodiment will be discussed with reference to FIG. 1 and FIG. 2.

The context unit shown in FIG. 1 is a context object (hereinafter written as context so far as confusion is not present) described as follows in the Embodiment 1. The contexts 1411 and 1421 shown in FIG. 2 operate in accordance with the operational flow shown in FIG. 4, which are external programs started by the WWW server when it receives GET as a read request for a file, or PUT as a write request to a file from the WWW browser 1003 with HTTP. The operation of the context will be detailed later with reference to FIG. 4.

The CGI system and Servlet system (Servlet system is described in "The Java Servlet API" in JavaWebServer version1.1) are well known as the methods that the WWW server uses to start an external program. In this embodiment, the WWW server is the JavaWebServer (hereinafter called as JWS) from Sun Microsystems Inc., and the context is the external program started by the JWS, which is packaged in the Servlet format.

The result holding unit shown in FIG. 1 is realized as a hash table of the Java in the Embodiment 1 as shown in FIG. 2, which holds the object being a result of the process as a snap shot object, and the virtual URL in a condition so that it can be fetched as a key. The processing server 1001 shown in FIG. 2 holds the snapshots 1311, 1312, 1313, 1314 in the hash table, and each of them can be fetched by the virtual URLs 1111, 1112, 1113, 1114 as a key. Also, the processing server 1002 holds the snapshot 1321, and fetches the virtual URL 2121 as a key. The result output unit is implemented as a program which outputs the object of a process result through the JWS using the HTTP protocol.

The result control units shown in FIG. 1 are implemented as programs in the Servlet format to control the hash tables that have held the snapshots as shown in FIG. 2, which are called snapshot managers 1511 and 1521. The snapshot managers 1511 and 1521 are packaged with methods that judge the validity of the snapshots. For the methods that judge the validity, there are those that are called from other Java programs and return a value in the logical value form of the Java. Also, there are those in which the JWS is started in response to the request, and the judgment result as to whether the snapshots are valid or not is outputted to the header of the HTTP. The operation of the snapshot managers will be discussed later in detail referring to FIG. 6 and FIG. 7.

Figure 3:
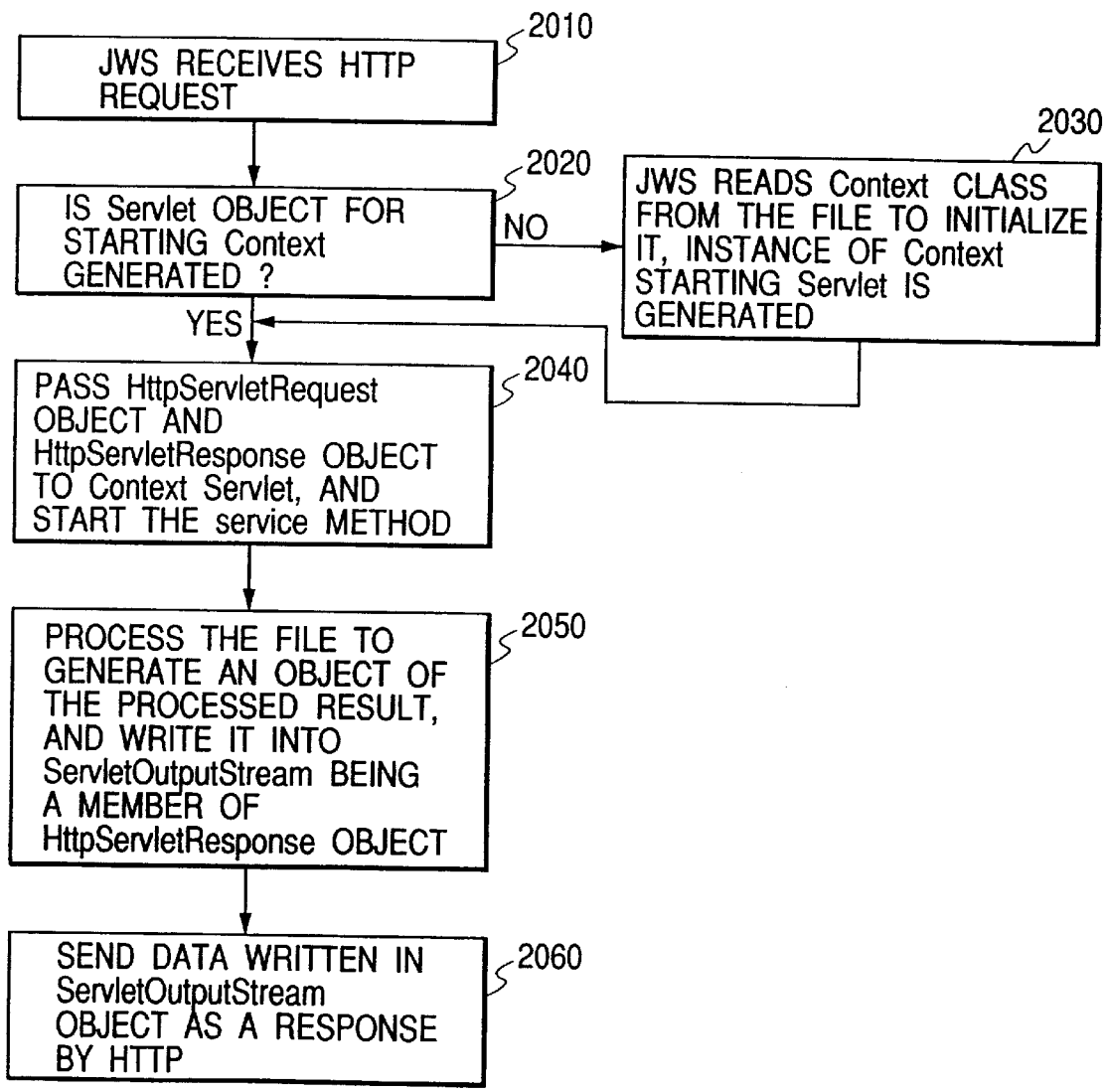
FIG. 3 is a chart to illustrate the total operational flow of the processing server in Embodiment 1 of the distributed file processor relating to the present invention.

3. The Operation of the Processing Server Next, the operation of the processing server will be discussed in detail. The operational flow of the server is shown in FIG. 3. As an example, the WWW browser 1003 will be set with a URL:

http://host1:8080/context/Edit?method=merge&url1=http %3A%2F%2Fhost0%2Fpage01.html and an explanation will be given for the case in which the read designation of a file is outputted.

In step 2010 in FIG. 3, in response to above output of the file read designation from the WWW browser 1003, the JWS having a host name with a DNS name called host 1, for example the processing server 1001 in FIG. 2, accepts the request with HTTP as the one below.

GET/context/Edit?method=merge&url1= http%3A%2F%2Fhost0 %2Fpage01.htmlHTTP/1.0

In step 2020, the JWS examines whether the program in the Java Servlet format called the Context class (hereinafter called context) is initialized or not. If it is not initialized, the JWS will read the class file in step 2030, and load it into the memory to initialize it so that it will become executable. Then the program will be started.

In step 2040, the JWS starts the method service of the Servlet context, by passing the object of an argument HttpServletRequest, and HttpServletResponse.

In step 2050, the context processes the file, and holds the result as a snapshot object. From the object of the argument, HttpServletResponce, the ServletOutputStream which holds the output stream to the client, the WWW browser, is fetched and the processed result is written. The detail of the operation of the context in step 2050 is as illustrated in FIG. 4, which will be discussed later.

In step 2060, the content of what has been written in the ServletOutputStream is outputted in response to the connection of the HTTP request.

4. The Operation of the Context

Figure 4:
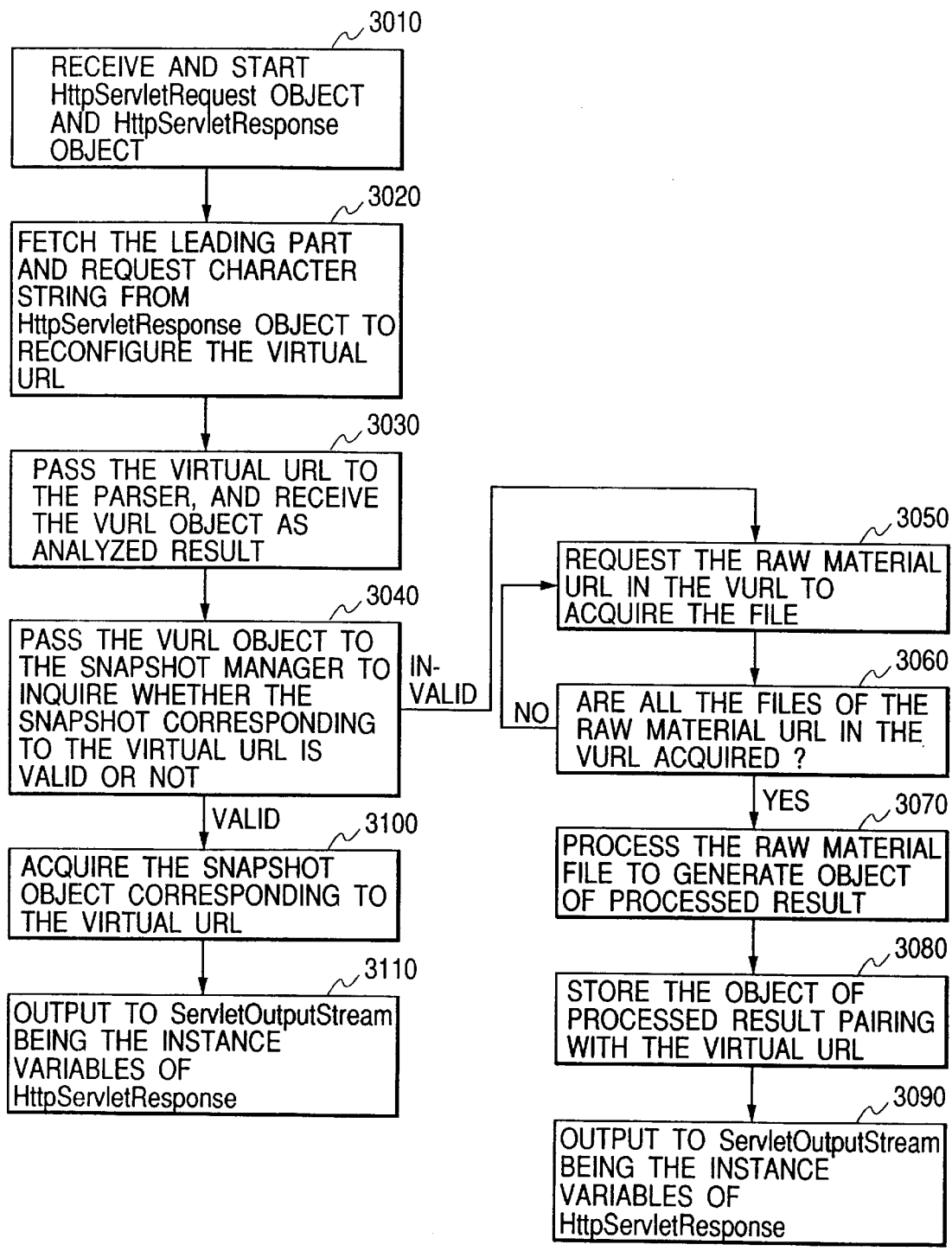
FIG. 4 is a chart to illustrate the operational flow of the context in Embodiment 1 of the distributed file processor relating to the present invention.

The operation of the context in step 2050 in FIG. 3 mentioned above will be detailed in accordance with the operational flow of the context shown in FIG. 4.

In step 3010 in FIG. 4, the method service of the Servlet context starts after accepting the object of an argument, HttpServletRequest and HttpServletResponse.

In step 3020, the character string,

/context/Edit?method=merge&url1= http%3A%2F%2Fhost0%2F page01.html which is included in the virtual URL is fetched by getRequestedURI method of the HttpServletRequest. This character string is merged with the reading part to repeat the following virtual URL:

http://host1:8080//context/Edit?method=merge&url1=http%3A%2F%2Fhost0%2Fpage01.html In step 3030, the virtual URL is passed to the parser for analysis. The operational flow of the URL parser is as shown in FIG. 5, and the detailed description of this operation will be given later. The URL parser generates an objects of the VURL class, and returns the method name, the URL of the raw material, and the parameter included in the URL by setting them into instance variables of the VURL object. The VURL object is an object that has the reading part of the virtual URL, the class name, the method name, the parameter, and the URL of the raw material as the instance variables.

Figure 6:
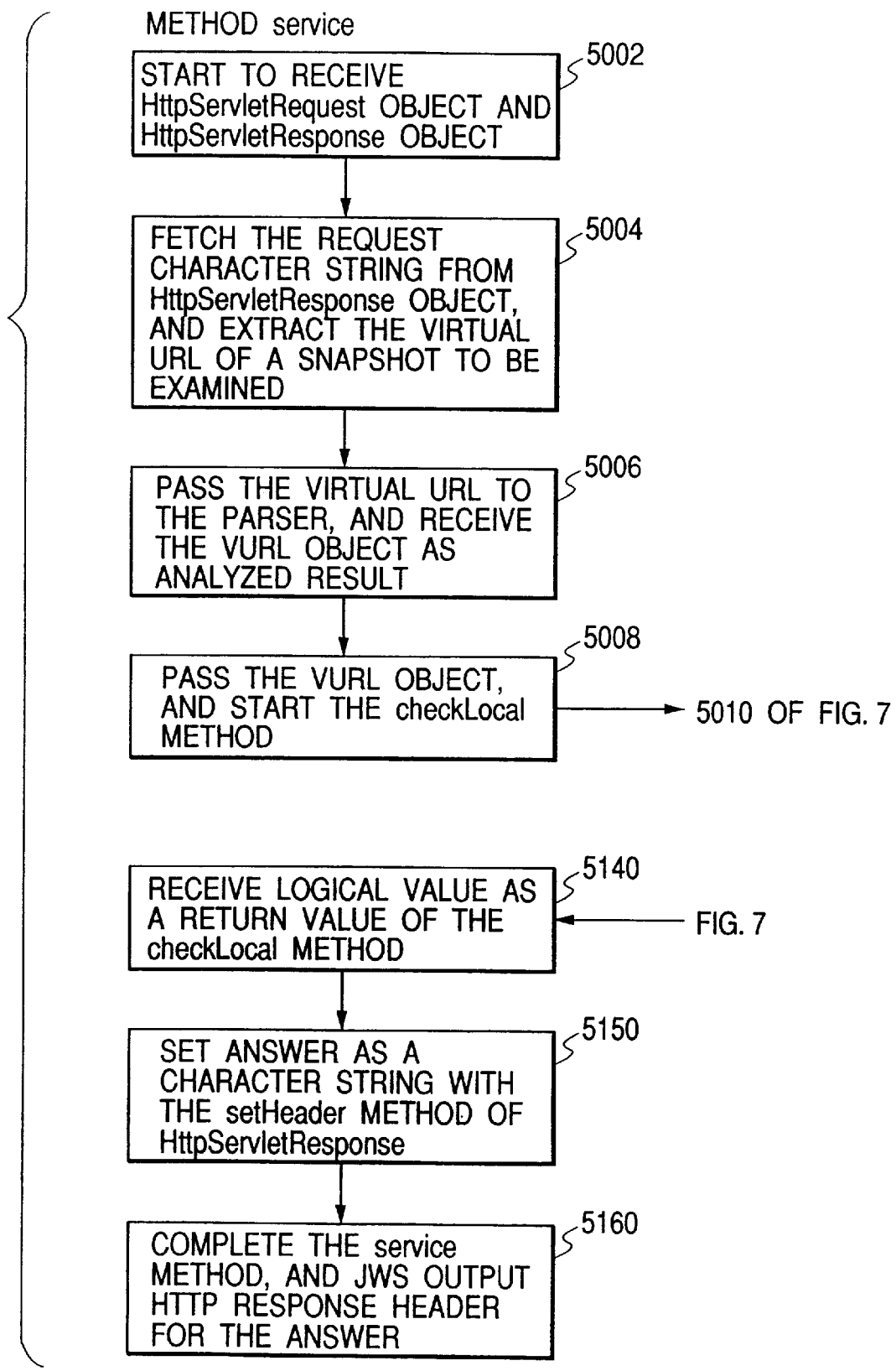
FIG. 6 is a chart to illustrate the operational flow (No. 1) of the snapshot manager in Embodiment 1 of the distributed file processor relating to the present invention.
Figure 7:
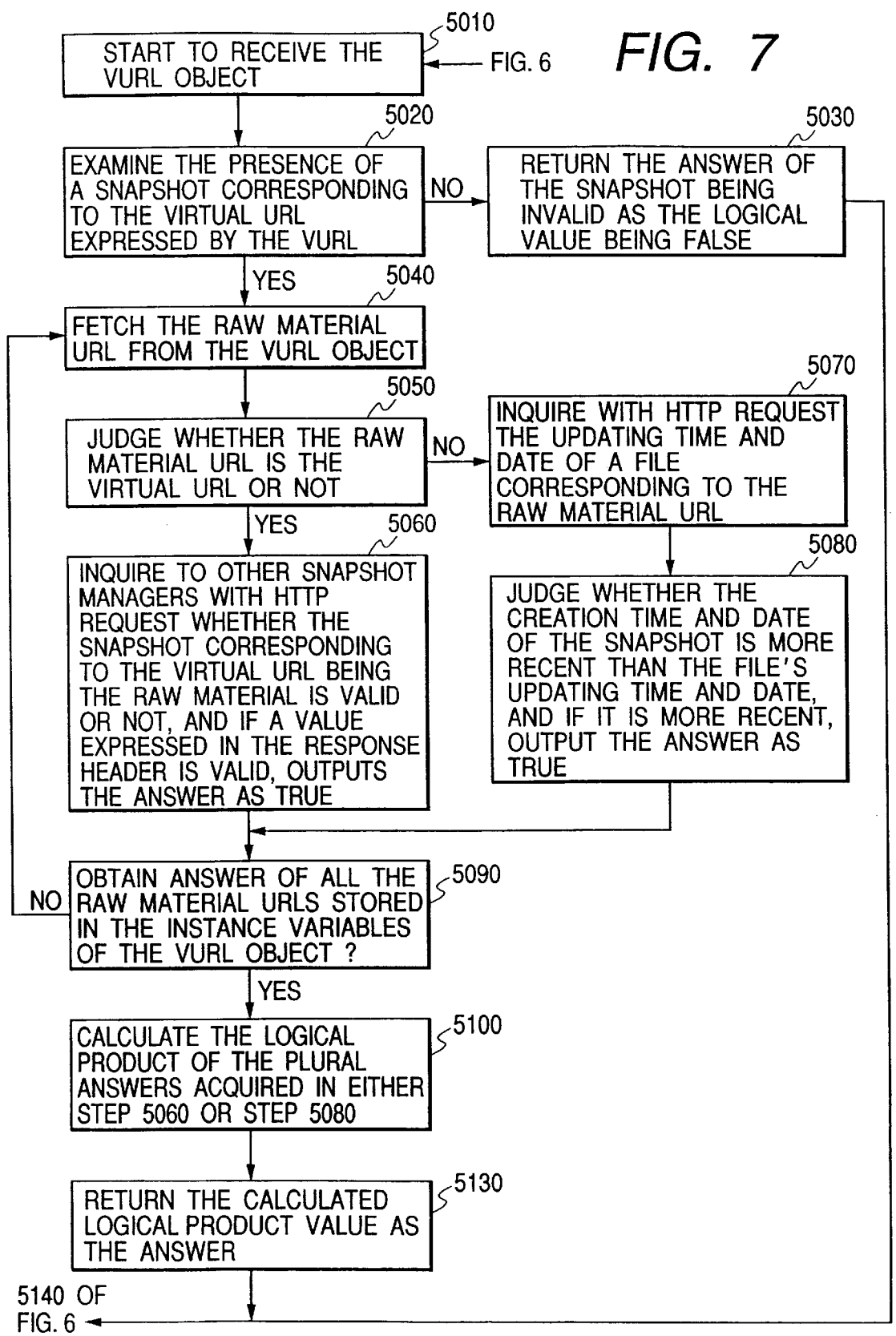
FIG. 7 is a chart to illustrate the operational flow (No. 2) of the snapshot manager in Embodiment 1 of the distributed file processor relating to the present invention.

In step 3040, the context 1411 passes VURL object to the snapshot manager 1511 and receives an answer as to whether the snapshot corresponding to the virtual URL is valid or not. The operation of the snapshot manager 1511 is as shown in FIG. 6 and FIG. 7, which will be discussed later.

When there is not a valid snapshot corresponding to the virtual URL, in step 3050, the HTTP request is sent to the URL of the raw material stored in the instance variables of the VURL object, and the raw material file is acquired.

In step 3060, whether all the raw material files have been acquired or not is examined, and if not, the step returns to step 3050.

In step 3070, the file acquired in step 3050 is used as an argument, and the method determined by the class name and the method name that are stored in the instance variables of the VURL object is started to generate an object with its returned value as a result of the process.

In step 3080, the object of the processed result is stored in the above mentioned hash table with the virtual URL as a key.

In step 3090, the object of the processed result is written into the SerevletOutputStream.

When a valid snapshot corresponding to the virtual URL is present, its snapshot object is fetched as a key from the hash table in step 3100.

In step 3110, the object is written to ServletOututStream.

The following description discusses the state in which the above mentioned method is started, and the raw material is processed and also how the result of the process is virtually acquired as a file, using the protocol of the distributed file. The above mentioned method is specified as a method to create an HTML document which is partly extracted from the HTML document. However, any method may be used as long as it is a program that inputs and outputs the HTML document. Also, the detail of the implementation of this method is irrelevant to the operation of the present invention.

With reference to FIG. 2 which shows the overall block diagram concerning this embodiment, the WWW server 1000 having the raw materials, the processing servers 1001 and 1002 operating the context and the procedure, and the WWW browser 1003 is connected with the network.

The raw material file 1801 is in the WWW server 1000, and its URL is http://host0/page01.html. This URL will be called the URL 1101.

The Edit being a class of the Java is present in the processing server 1001. The above mentioned method is specified as a method summary 1211 being a method of the Edit class. The host name of the processing server 1001 is host 1, and the port number is 8080. The WWW browser 1003 sends requests with the virtual URL 1111 as the one below, configured by qualifying the raw material file name URL 1101. http://host1:8080/context/Edit?method=summary&url1=ht tp%3A%2F%2Fhost0%2Fpage01.html When the processing server 1001 with the host name host 1 receives the HTTP request from the WWW browser 1003 with the virtual URL 1111, the context 1411 is started by the JWS. The context 1411 operates in accordance with the procedure of FIG. 4, and generates the Java object VURL 1111 (obj) expressing the virtual URL 1111 by analyzing it with the URL parser 1611.

5. The operation of the URL parser

The operation of the URL parser 1611 when this virtual URL 1111 is inputted will be described with reference to the flow chart illustrated in FIG. 5. The URL parser 1611 is started by accepting the virtual URL 1111 in step 4010 in FIG. 5. In step 4020, the virtual URL 1111 is delimited by the symbol / into the reading part http://host1:8080/context/ and the rest of the character string, Edit?method=summary&url1=http%3A%2F%2Fhost0%2Fpage01.html.

In step 4030, the rest of the character string is delimited by ? into the class name Edit and the rest of the character string method=summary&url1=http%3A%2F%2Fhost0%2Fpage01.html.

In step 4040, from the rest of the character string, a character string in the format of <propertyName>=<propertyValue> is extracted. The character string including the method name, method=summary, is fetched.

In step 4050, as to the fetched character string in the format of <propertyName>=<propertyValue> is judged whether the propertyName is method. As to the character string method=summay including the method name, the step advances to step 4060.

In step 4060, from the character string including the method name method=summary, summary, being the value of the propertyvalue, is fetched, which becomes the method name.

In step 4080, whether the process of the character string in the format of <propertyName>=<propertyValue> is completed is examined, and since it is not, the step returns to step 4040.

In step 4040, the character string including the raw material page name, url1=http%3A%2F%2Fhost0%2Fpage01.html is fetched from the rest of the character string using & as a delimiter.

In step 4050, whether the propertyName is method or not is judged. As for the character string, url1=http%3A%2F%2Fhost0%2Fpage01.html, the step advances to step 4070.

In step 4070, http://host0/page1.html being the URL of the raw material page is fetched from the character string url1=http%3A%2F%2Fhost0%2Fpage01.html. This is the URL 1101 in FIG. 2.

In step 4080, since the process of the fetched character strings in the format of <propertyName>=<propertyValue> is all finished, the step advances to step 4090.

In step 4090, an object of the VURL class expressing the virtual URL is generated, and the reading part http://host1:8080/context/, the class name Edit, the method name summary, and http://host0/page01.html being the URL of the raw material are set as a value of the instance variables. This concludes the operation of the URL parser 1611 when the virtual URL 1111 is inputted.

The context 1411 passes the object VURL 1111 (obj) to the snapshot manager 1511, and queries the validity of the snapshot object corresponding to the virtual URL 1111.

6. The Operation of the Snapshot Manager

The snapshot manager 1511 examines the validity of the snapshot objects corresponding to the virtual URL 1111 in accordance with the procedure of the operational flow illustrated in FIG. 6 and FIG. 7.

When the snapshot manager 1511 is called by other snapshot managers with the HTTP request, it is started as the Servlet from the JWS, and the method service starting from step 5002 is called. This HTTP request is given with a URL including the virtual URL corresponding to the snapshot that has to be examined for its validity in the argument object of the service method. For example, the URL used for querying the validity of the snapshot corresponding to the virtual URL, http://host2:8080/context/Edit?method=summary&url1= ht tp%3A%2F%2Fhost0%2Fpage01.html to the snapshot manager 1521 in the server host 2 (for example the processing server 1002 in FIG. 2) is:

http://host2:8080/sevrlet/snapshot?url=http%3A%2F%2- Fhost2%3A8080%2FEdit%3Fmethod%3Dsummary%- 26url1%3Dhttp%253A%252F%252Fhost0%- 252Fpage01.html.

If the snapshot manager is called from the Java program such as the context servlet, the method checkLocal starting with step 5010 is started.

In step 5002, the snapshot manager is started with HttpServletRequest and HttpServletResponse object as input.

In step 5004, it uses the getQueryString ( ) method of the HttpServletRequest object to fetch the virtual URL of the snapshot to confirm the validity thereof and release the coding if necessary.

In step 5006, it parses the fetched virtual URL mentioned above and generates the VURL object.

In step 5008, it starts the method checkLocal starting from step 5010 with the VURL object as an argument.

In step 5010, the VURL 1111 (obj) being the VURL object is used as input to start the manager.

In step 5020, the presence of the snapshot object corresponding to the virtual URL 1111 expressed by the VURL 1111 (obj) is examined. This snapshot object configures the virtual URL 1111 from the value of the instance variables of the VURL 1111 (obj), and examines whether or not the snapshot object held in the hash table with the virtual URL 1111 as a key is present. If it is present, the manager proceeds to step 5040, and if it is not, the manager moves to step 5030.

If the snapshot is not present, in step 5030, the answer of the snapshot will be invalid, and outputted by expressing that the logical value of Java is false, and returned to the calling party.

If the snapshot is present, in step 5040, the URL 1101 being the URL of the raw material is fetched from the VURL 1111 (obj).

In step 5050, whether the fetched URL of the raw material is the virtual URL or not is examined, and if it is the virtual URL, the step advances to step 5060, and if it is not the virtual URL, the step proceeds to step 5070. Since the URL 1101 is not the virtual URL, the step proceeds to step 5070.

In step 5060, when the URL of the raw material fetched in step 5050 is the virtual URL, a request to make the snapshot manager confirm the validity is sent with HTTP to the host specified by the host name in the virtual URL. The URL used for the request instructs the starting of the snapshot manager being the Servlet, and the passing of the raw material's URL by including it into the argument object of the service method to the JWS.

In response to the request, the snapshot manager returning the response outputs the answer in the HTTP response header after the header name Snapshot-Valid: and sends the response. The snapshot manager accepting the response extracts the character strings either "true" or "false" from the header and takes on it as an answer.

In step 5070, the updating time and date of the raw material file of the URL 1101 is acquired.

In step 5080, the updating time and date of the file of the URL 1101 and the creation time and date of the snapshot object 1311 corresponding to the virtual URL 1111 are compared. If the file's updating time and date is more recent, the answer of the logic value is "true". If the creation time and date is more recent, then the answer will be "false".

In step 5090, whether or not the judgement of the validity of the snapshot against all the URLs of the raw materials stored in the instance variables of the VURL 1111 (obj) is finished is examined, and if it isn't, the step returns to step 5040. Here, the result for the URL 1101 is already acquired, and all the judgements done, so the step advances to step 5100.

In step 5100, the logical product of the answer for the snapshots' validity against the raw materials' URLs acquired in either step 5060 or step 5080 is calculated.

In step 5130, the value of the logical product calculated in step 5100 is considered as the validity of the snapshot, expressed as Java's logical value and returned to the calling party.

In step 5140 of the method service, the logical value of Java is accepted as a return value of the method checkLocal.

In step 5150, the answer to the validity of the snapshot is stored in the variable expressing the HTTP response header, using the setHeader method against the HttpServletResponse object. The answer comes after the character string Snapshot-Valid:, and if the value of the method checkLocal is true, the process links the character string "true" as the value of the header, and if it is false, links the character string "false".

In step 5160, the method service is terminated and the JWS outputs the value of the HttpServletResponse with HTTP.

This concludes the procedure shown in FIG. 6 and FIG. 7 which is the procedure of the snapshot manager 1511 for answering the validity of the snapshots corresponding to the virtual URL.

7. The Process During Response a. When the Snapshot is Valid

As discussed in the section of "the operation of the context", the context 1411 acquires the snapshot object 1311 corresponding the virtual URL when the snapshot is judged to be valid (FIG. 4, step 3100). Furthermore, the snapshot object 1311 is outputted as a response to the WWW browser following the procedure explained in FIG. 3 (FIG. 3, step 2060).

b. When the Snapshot is Invalid

The context 1411 sends a request to acquire a file to the WWW server 1000 with the raw material file name URL 1101, when the snapshot corresponding to the virtual URL 1111 is judged to be invalid. With this request, the context 1411 acquires the raw material page 1801 corresponding to the raw material name URL 1101 (FIG. 4, step 3060), and starts the method summary 1211 specified in the request URL 1111 from the WWW browser 1003. The method summary 1211 is a process to output the object of a process result in which a specific part is extracted out of the raw material pages by using HTML documents as an input and the part is embedded into a newly created HTML page. The context 1411 stores the output object into the hash table as the snapshot object 1311, pairing the object of the process result with the virtual URL 1111 (FIG. 4, step 3080). Then, following the procedure explained in FIG. 3, the snapshot 1311 is outputted as a response to the WWW browser 1003 (FIG. 3, step 2060).

The virtual URL 1111 request sent from the WWW browser 1003, http://host1:8080/context/Edit?method=summary&url1= ht tp%3A%2F%2Fhost0%2Fpage01.html is processed in accordance with the procedure explained above.

Embodiment 2

In the configuration of the aforementioned Embodiment 1, the configuration enabling the procedure process with one processing server, such as the processing server 1001, or the processing server 1002 shown in FIG. 2 has been discussed. In this Embodiment 2, the configuration will be discussed, in which a plurality of processing servers execute various processes cooperatively to carry out the responses in correspondence with the requests of the WWW browser.

The second embodiment will now be described. In the configuration in FIG. 2 explained in the first embodiment, the process of a file using two procedures in two servers (for example, the processing servers 1001, 1002 in FIG. 2) can be carried out by assuming the virtual URL as the URL of the raw material. An example will be discussed, in which a summary of the HTML documents is created therefrom using two contexts to merge the created results.

In the following discussion, the operational procedures of the processing servers 1001 and 1002, the contexts 1411 and 1421, the URL parsers 1611 and 1621, the snapshot managers 1511 and 1521 are the same as what has been explained in the Embodiment 1. Therefore the detailed description for each will be omitted. Also, the abbreviation rules for the URLs and the virtual URLs given in the previous discussion will be used.

With reference to FIG. 2, there are class Edits which edit the HTML documents for each processing servers 1001 and 1002. And, the Edit class includes the method summary which extracts a part of the HTML document and outputs it as one HTML document, and the method merge which synthesizes a plurality of the HTML documents to output it as one HTML document.

The raw material files 1801, 1802, 1803, and 1804 lie in the WWW server 1000, and the URL for each file will be called "A", "B", "C", and "D", in accordance with the abbreviation rule discussed in the Embodiment 1. The process by the method summary 1211 in the class Edit started by the context 1411 in the server 1001 will be expressed as "f". And the process of the method merge 1222 in the class Edit started by the context 1421 in the server 1002 will be expressed as "g".

When the server 1002 receives the HTTP request for the virtual URL: g (f (A), f (B), f(C), f (D)), the context 1421 of the server 1002 queries the snapshot manager 1521 of the server 1002 for the validity of the snapshot corresponding to the g (f (A), f (B), f(C), f (D)). The snapshot manager 1521 of the server 1002 operates in accordance with the procedure in FIG. 6 and FIG. 7, and if necessary, extracts four virtual URLs: f (A), f (B), f(C), f (D) for the server 1001 from g (f (A), f (B), f(C), f (D)), and sends a request to the snapshot manager 1511 querying the validity of the snapshots for each of the virtual URLs.

The snapshot manager 1511 accepts each request, and judges the validity of the snapshots individually by request, and makes its decision in accordance with the procedure shown in FIG. 6 and FIG. 7, and returns the answer for the validity of the snapshots by each request.

The snapshot manager 1521 of the server 1002 receives the answer for the validity of the snapshots corresponding to the four virtual URLS: f (A), f (B), f(C), f (D) if necessary, and calculates the validity of the snapshots corresponding to g (f (A), f (B), f(C), f (D)), and returns the answer to the context 1421.

If the snapshot is invalid, the contexts 1421 and 1411 operate in accordance with steps in FIG. 4 respectively, generate the objects of the process result started by the virtual URLs: g (f (A), f (B), f(C), f (D)), and stores them as snapshots. From the steps discussed above, the WWW browser 1003 receives the HTML document with the result of the process (merge) of extracting the summary for the four raw material pages in the server 1000 synthesized into one HTML document.

Also, after the process is finished, the already created process result can be outputted if none of the raw material pages 1801, 1802, 1803, and 1804 in the WWW server 1000 is updated, when the request has been sent from the WWW browser 1003 with the same virtual URL. Furthermore, if one or more of the raw material pages are updated, the snapshot of the process result with the updated page as input will be judged as invalid, the process starts again regenerating a snapshot and outputting the result.

Suppose that, for example, the request by the virtual URL: g (f (A), f (B), f(C), f (D)) is sent to generate the snapshot 1321 corresponding to the virtual URL: g (f (A), f (B), f(C), f (D)), and the snapshots 1311, 1312, 1313, and 1314 as the snapshots corresponding to the four virtual URLS: f (A), f (B), f(C), f (D) are generated.

Later, when the request by the virtual URL: g (f (A), f (B), f(C), f (D)) is sent again after the updating of the raw material file 1801 expressed as URL: A, the snapshot manager 1511 returns the answer that the snapshot 1311 is invalid and the snapshots 1312, 1313, and 1314 are valid. Also, the snapshot manager 1521 returns the answer that the snapshot 1321 is invalid. As a result, the context 1421 restarts the process of the method merge 1222 by the virtual URL: g (f (A), f (B), f (C), f (D)), but the processes by the three virtual URLs: f (B), f(C), f (D) among the inputs of the method merge 1222 will not be executed, and the three snapshots 1312, 1313, and 1314 corresponding to each of the three virtual URLs will be inputted. The process by the virtual URL: f (A) is executed, the snapshot 1311 is updated, and the result is inputted into the method merge 1222.

As such, when a user desires to acquire the latest process result reflecting the update of the raw material file, the minimum process necessary for acquiring the latest process result is implemented. Other than that, the snapshots of the results from the previous process are used, which enables the time reduction of the response to the request.

Also, when using processes started by contexts in a plurality of the servers on a network with low reliability by combining them as one process, the final process result cannot be acquired if there is one or more errors in the communication. Also in such a case, if the whole process is retried, and one or more errors in the communication occur, the process result cannot be acquired. In the present invention, a part of the process result is held as a snapshot object in such a case, which increases the probability of acquiring the process result by retry.

In the above mentioned example, the case with two contexts has been discussed, but it is also possible to combine the processes in accordance with the same procedure with three or more contexts.

Embodiment 3

As the third embodiment of the present invention, a configuration that judges the validity of the snapshot depending on data other than the raw material file names included in the qualified URL will be discussed. The system configuration is the same as the one for the Embodiment 1, which is shown in FIG. 2.

The system configuration is basically the same as discussed in Embodiment 1, but when the snapshot managers 1511 and 1521 judge the validity of the snapshots, a specific object is examined in accordance with a specific rule in the processing servers 1001 and 1002, respectively, or in each designated procedure, and the validity of the snapshots is determined by the result.

An example will be explained which constantly displays the dates of processes in the HTML file representing the process result, in the method summary during the synthesizing of documents discussed in the Embodiment 1.

When a user of the WWW browser 1003 wants to acquire the process result with the latest information that can be obtained at that time, the updating of date information according to the date and time at which the process is executed will be necessary. Therefore, if the date changes, the snapshot objects that are already created and held has to be updated also. But in the procedure explained in the Embodiment 1, as long as the information for referring to the date information is not included in the virtual URL, whether the snapshot objects should be updated or not cannot be determined.

The configuration of this embodiment is realized in the configuration shown in FIG. 2. The operations of the snapshot managers 1511 and 1521 are shown in FIG. 8 and FIG. 9, though it differs in step 5092 to 5100 from Embodiment 1.

Figure 8:
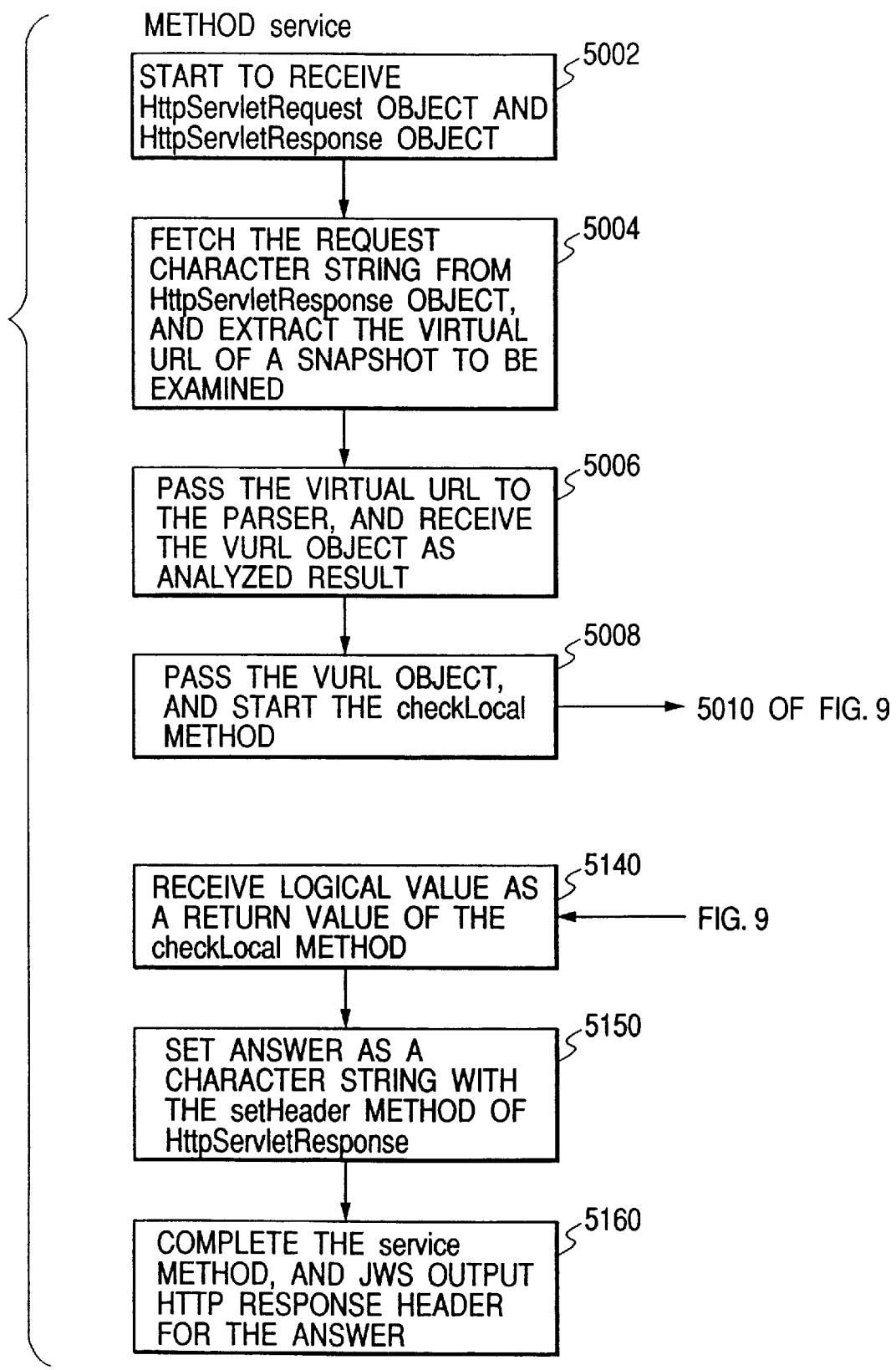
FIG. 8 is a chart to illustrate the operational flow (No. 1) of the snapshot manager in Embodiment 3 of the distributed file processor relating to the present invention.
Figure 9:
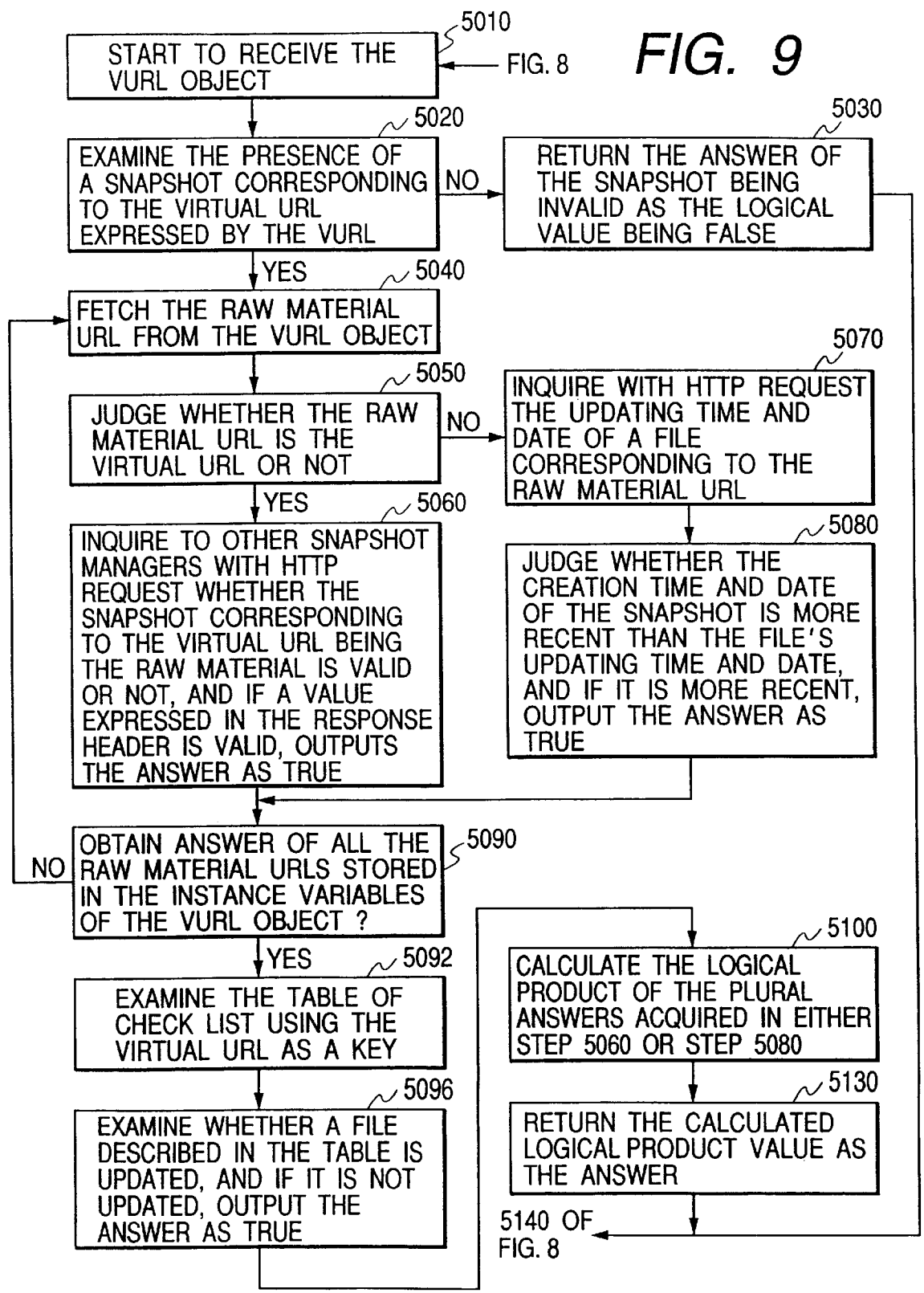
FIG. 9 is a chart to illustrate the operational flow (No. 2) of the snapshot manager in Embodiment 3 of the distributed file processor relating to the present invention.

Having received a request with the virtual URL 1111, the snapshot manager 1511 in the server 1001 shown in FIG. 2, while determining the validity of the snapshots, uses the virtual URL 1111 as a key in step 5092 in FIG. 8 and FIG. 9, and acquires the list of file names from the hash table where the checklist is included. In step 5096, the snapshot manager checks whether the files in the list are updated. And in step 5100, the snapshot manager determines the validity of the snapshots combining the result of the examination of the previously mentioned file names and the result obtained from the files included in the virtual URL 1111.

The request from the previously mentioned user of the WWW browser 1003 can be accomplished by preparing a file with a date of the system time as a file name corresponding to the virtual URL 1111 in the list. Also, the file included in the checklist in this embodiment may have the file name of the WWW file access that starts a program using CGI for example.

By using the procedure of this embodiment, a procedure creator becomes able to determine the rule whether to update the snapshots by storing the list of file names in the checklist. If the procedure creator knows the point at which the process result generated from the procedure becomes invalid, the judgment on the validity of the snapshots becomes more accurate by using this method.

Embodiment 4

As the forth embodiment of the present invention, a configuration that enables the designation of cancellation or invalidation of the snapshots held in the processing servers 1001 and 1002 will be described.

In the same system configuration as in Embodiment 1 shown in FIG. 2, the parameter designating the cancellation of the snapshots will be included in the query part of the description in the virtual URL sent by the client. For example, the virtual URL 1111 shown in FIG. 2 is http://host1:8080/context/Edit?method=summary&url1=ht tp%3A%2F%2Fhost0%2Fpage01.html, to which the parameter description controll=clear is added as a control command description of the snapshots, creating http://host1:8080/context/Edit?method=summary&control 1=clear&url1=http%3A%2F%2Fhost0%2Fpage01.html.

Figure 10:
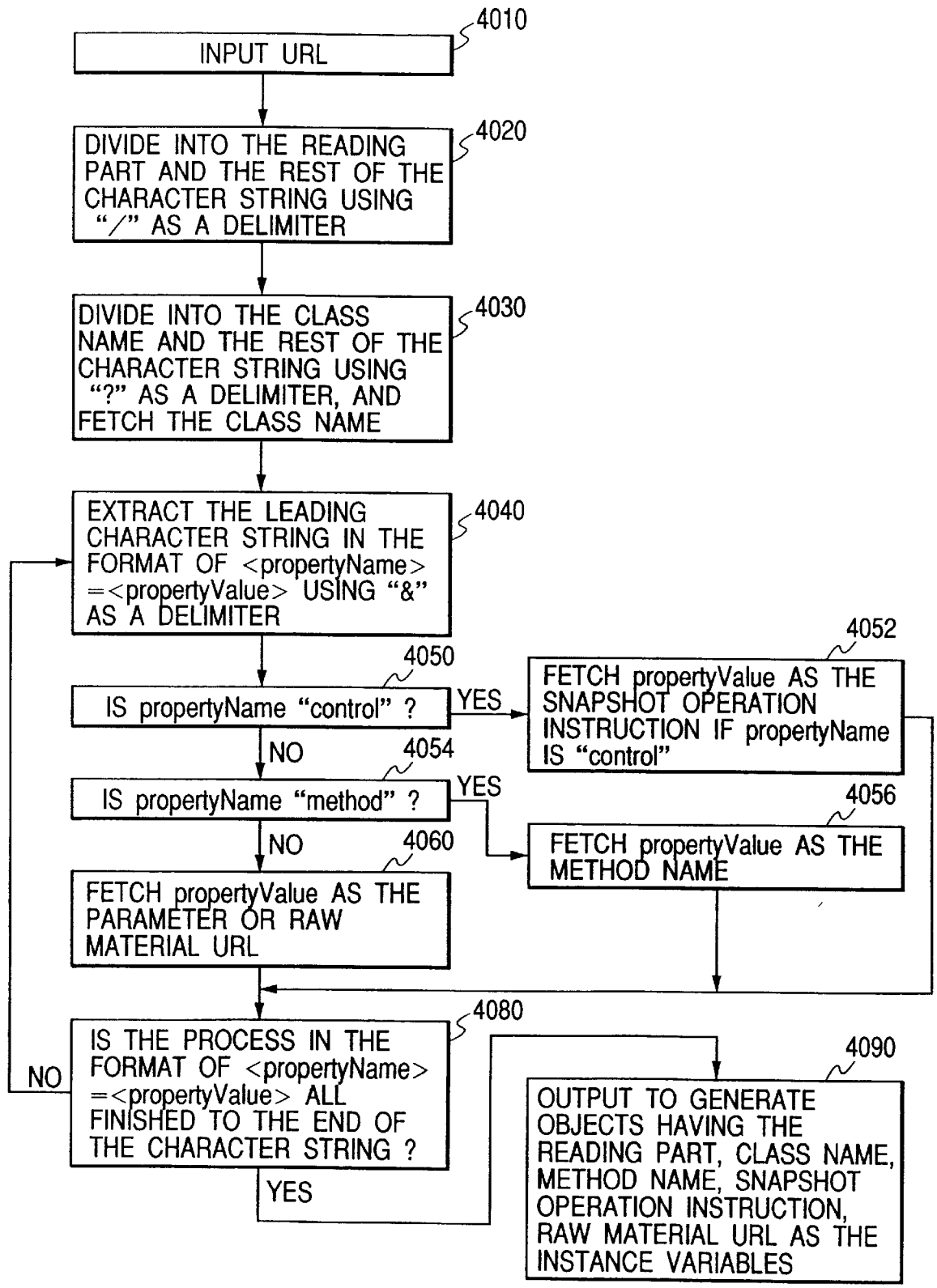
FIG. 10 is a chart to illustrate the operational flow of the URL parser in Embodiment 4 of the distributed file processor relating to the present invention.

When adding the function to fetch the parameter designating the cancellation of the snapshots to the URL parsers 1611 and 1621 mentioned in Embodiment 1, the operational flow of the URL parsers 1611 and 1621 will be illustrated as shown in FIG. 10. The difference in the operational flow of the URL parsers from that in the embodiment 1 is the point that the operation fetching the command of the snapshot control is added between step 4050 to step 4052.

Figure 11:
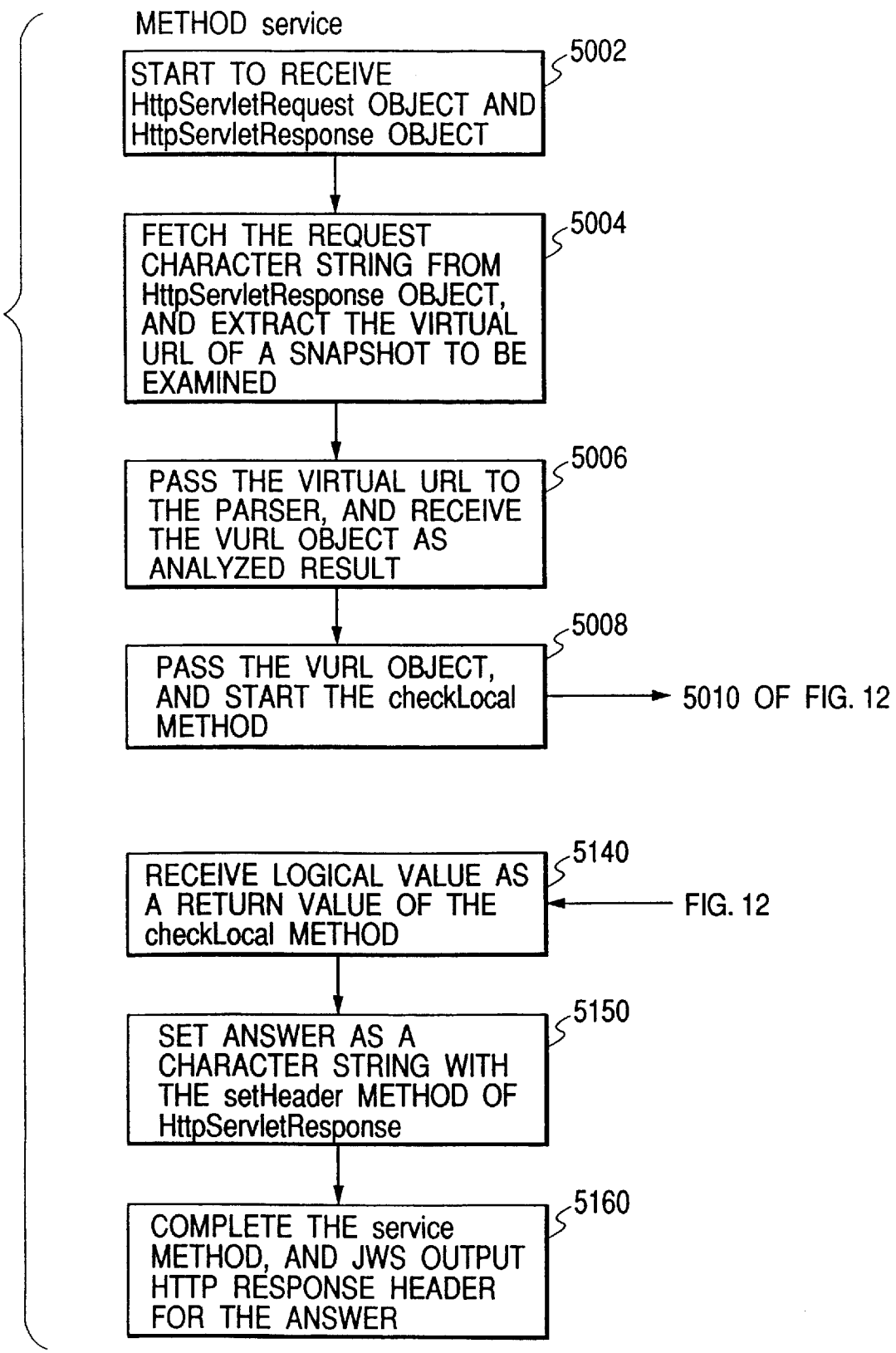
FIG. 11 is a chart to illustrate the operational flow (No. 1) of the snapshot manager in Embodiment 4 of the distributed file processor relating to the present invention.
Figure 12:
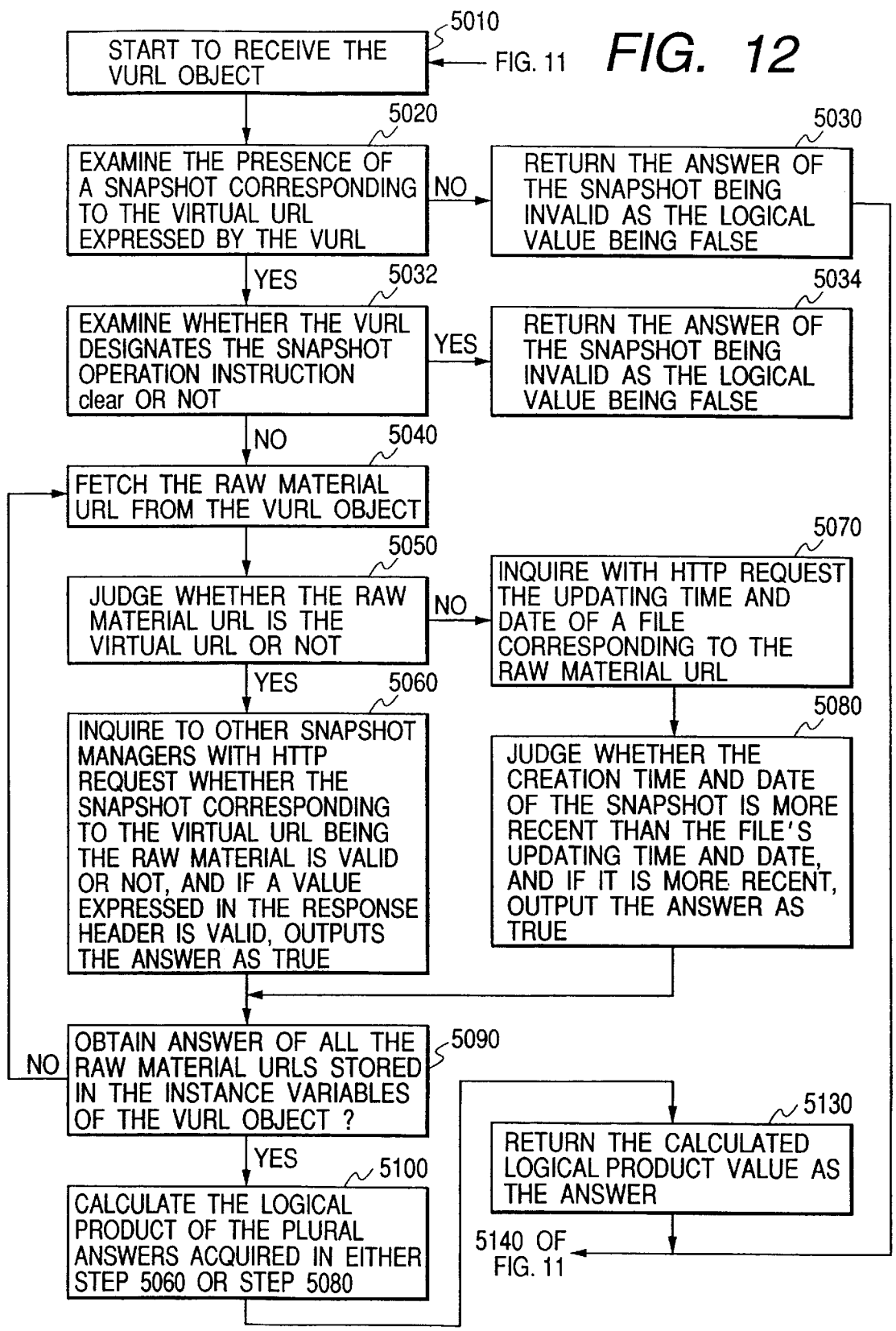
FIG. 12 is a chart to illustrate the operational flow (No. 2) of the snapshot manager in Embodiment 4 of the distributed file processor relating to the present invention.

The operational flow of the snapshot managers 1511 and 1521 is shown in FIG. 11 and FIG. 12. In this embodiment, what differs from the operation of the snapshot managers in Embodiment 1 appears in steps 5032 through 5034. In steps 5032 through 5034, if the parameter clear designating the cancellation of the previously mentioned snapshot from the virtual URL is fetched, the snapshot managers execute the operations invalidating the snapshots corresponding to the designated URLs.

Thereafter, the contexts operate in the same manner as in Embodiment 1, acquire the raw material files and start the processes, and hold the objects of the newly created process results in the hash tables. Describing the parameter designating the cancellation of the snapshots into the HTTP request header brings out the same effect. The contexts fetch the HTTP request headers from the HttpServletRequest objects passed by the JWSs, and if they contain the parameters designating the cancellation of the snapshots, the contexts command the snapshot managers to cancel the snapshots corresponding to the designated URLs.

In Embodiments 1 through 3, the invalidation of the snapshots has been determined by the snapshot managers of the servers holding the snapshots. But in this embodiment, the invalidation of the process result can be designated by other computers, thus satisfying the needs of the users who want to acquire the result of the retried process, not the existing snapshots, and also enabling the hold of newly generated process results as snapshots.

Embodiment 5

Figure 13:
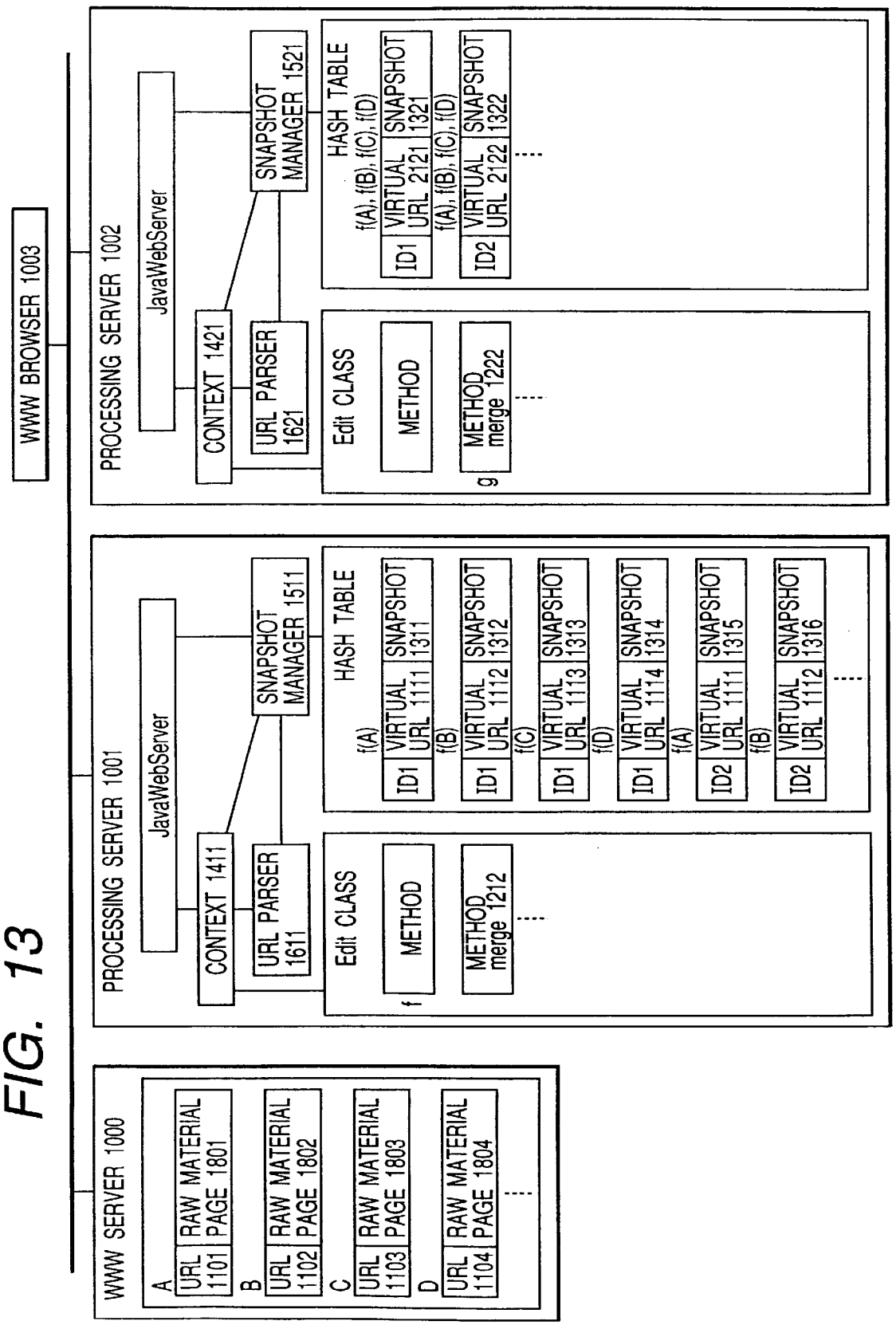
FIG. 13 is a chart to illustrate a detailed configuration of Embodiment 5 in the distributed file processor relating to the present invention.

Also, as the fifth embodiment of the present invention, a configuration that acquires to designate the object generated by a specific request by holding the snapshot object of the process result in pairs with the identification data (ID) inherent to the request having generated the object will be explained. The configuration of this embodiment will be shown in FIG. 13. In FIG. 13, the snapshots 1311, 1312 . . . , 1321 . . . in the hash tables in the processing servers 1001 and 1002 hold the corresponding identification data (ID).

In the previously explained Embodiment 1, the requests applying the same procedures to the same raw materials were considered identical. That is, when the identical request has been received and the process has been retried, after a process is executed to a request and the result is held as a snapshot object, the process result of the second request mentioned above is held overriding the snapshot object generated by the first request mentioned above.

In this embodiment, the identification data (ID) inherent to each request is allocated, and the snapshot objects are generated and held in association with the identification data. The client is able to designate an identifier inherent to the request and acquire the snapshot object corresponding thereto. Also, by using the procedure discussed in Embodiment 4, the snapshot object corresponding to the designated identifier can be canceled, and a new process result can be held in association with the same identifier.

Figure 14:
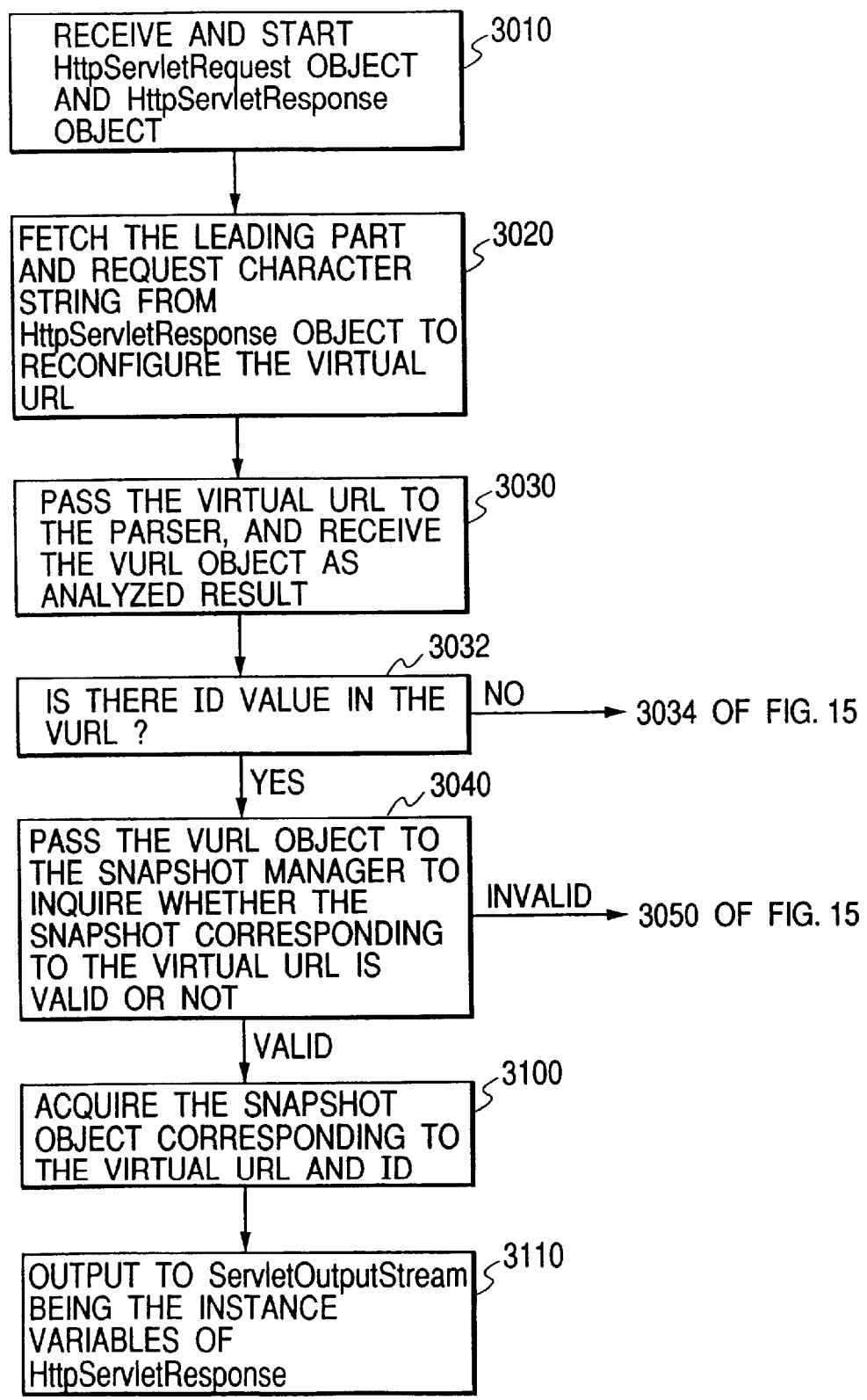
FIG. 14 is a chart to illustrate the operational flow (No. 1) of the context in Embodiment 5 of the distributed file processor relating to the present invention.
Figure 15:
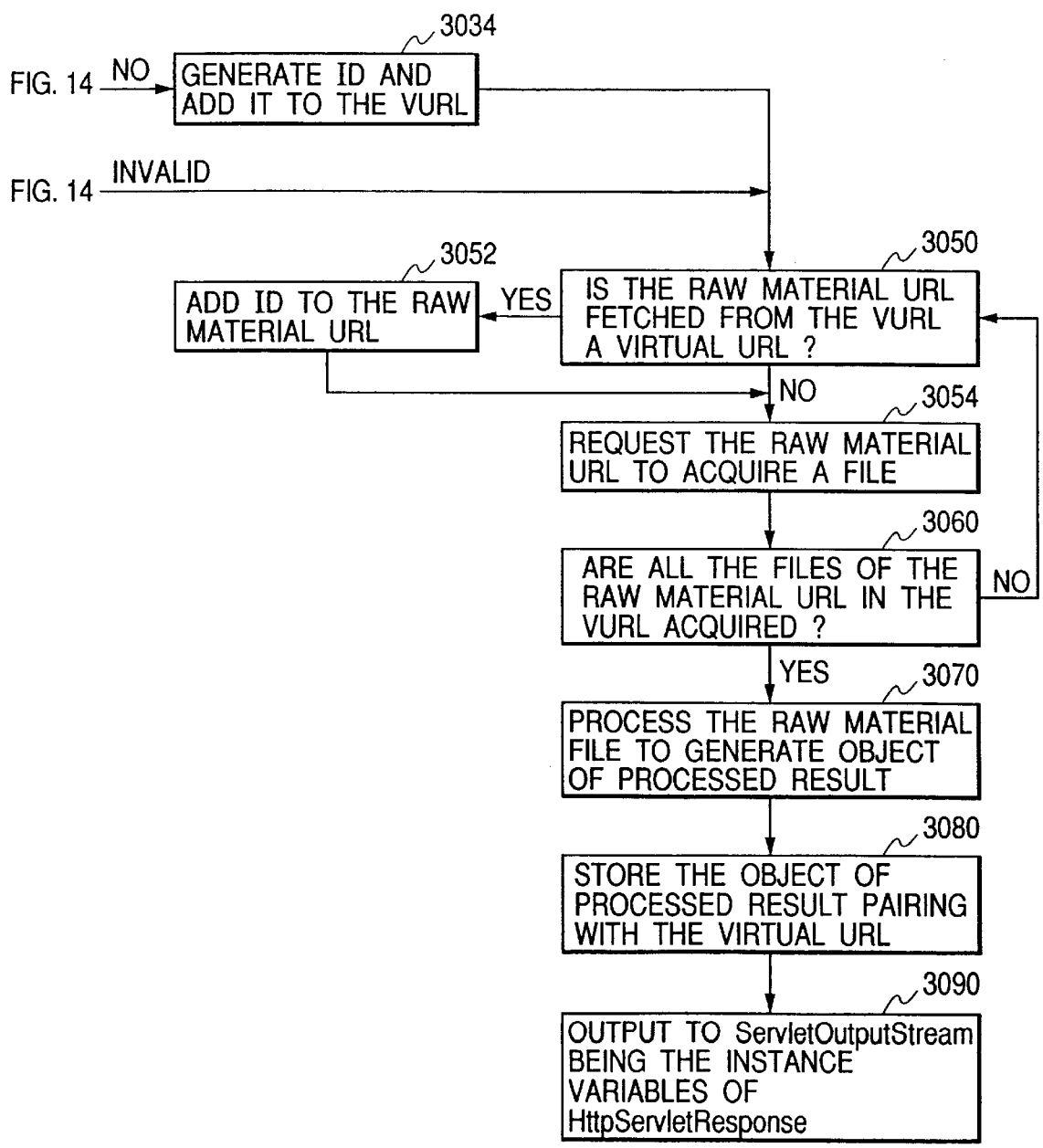
FIG. 15 is a chart to illustrate the operational flow (No. 2) of the context in Embodiment 5 of the distributed file processor relating to the present invention.

The operation of the context in this embodiment is shown in FIG. 14 and FIG. 15. The context receiving a HTTP request uses the URL parser which operates in accordance with FIG. 16 to analyze a URL and generate an object, but when an identifier (ID) is not included in the URL, the context generates identification data inherent to each request and adds them to the virtual URL. The identification data can be materialized as an integer value of the request's occurring order, as an example. Also, as another example, it can be materialized as a numeric value of the system time. The parameter designating the snapshot ID is added to the virtual URL.

For example, The URL 1111 for starting the process by the method summary extracting a portion of the HTML document of the class Edit mentioned in Embodiment 1 is http://host1:8080/context/Edit?method=summary&url1= ht tp%3A%2F%2Fhost0%2Fpage01.html, but as a description for adding the ID to this, http://host1:8080/context/Edit?method=summary&id= 1&ur l1=http%3A%2Fhost0%2Fpage01.html is generated in the format describing a number after the description id=.

The operational flow of the context is shown in FIG. 14 and FIG. 15. The operational procedure will be explained with an example. When the context 1411 in the processing server 1001 shown in FIG. 13 receives a request with the virtual URL 1111, in step 3010, the method service in the servlet context starts to accept and start the objects HttpServletRequest and HttpServletResponse of an argument.

In step 3020, the character string /context/Edit?method= merge&arg1=x&arg2=y included in the virtual URL is fetched by getRequestedURI method of the object HttpServletRequest. The virtual URL is reconfigured by synthesizing this character string with the leading part.

Figure 17:
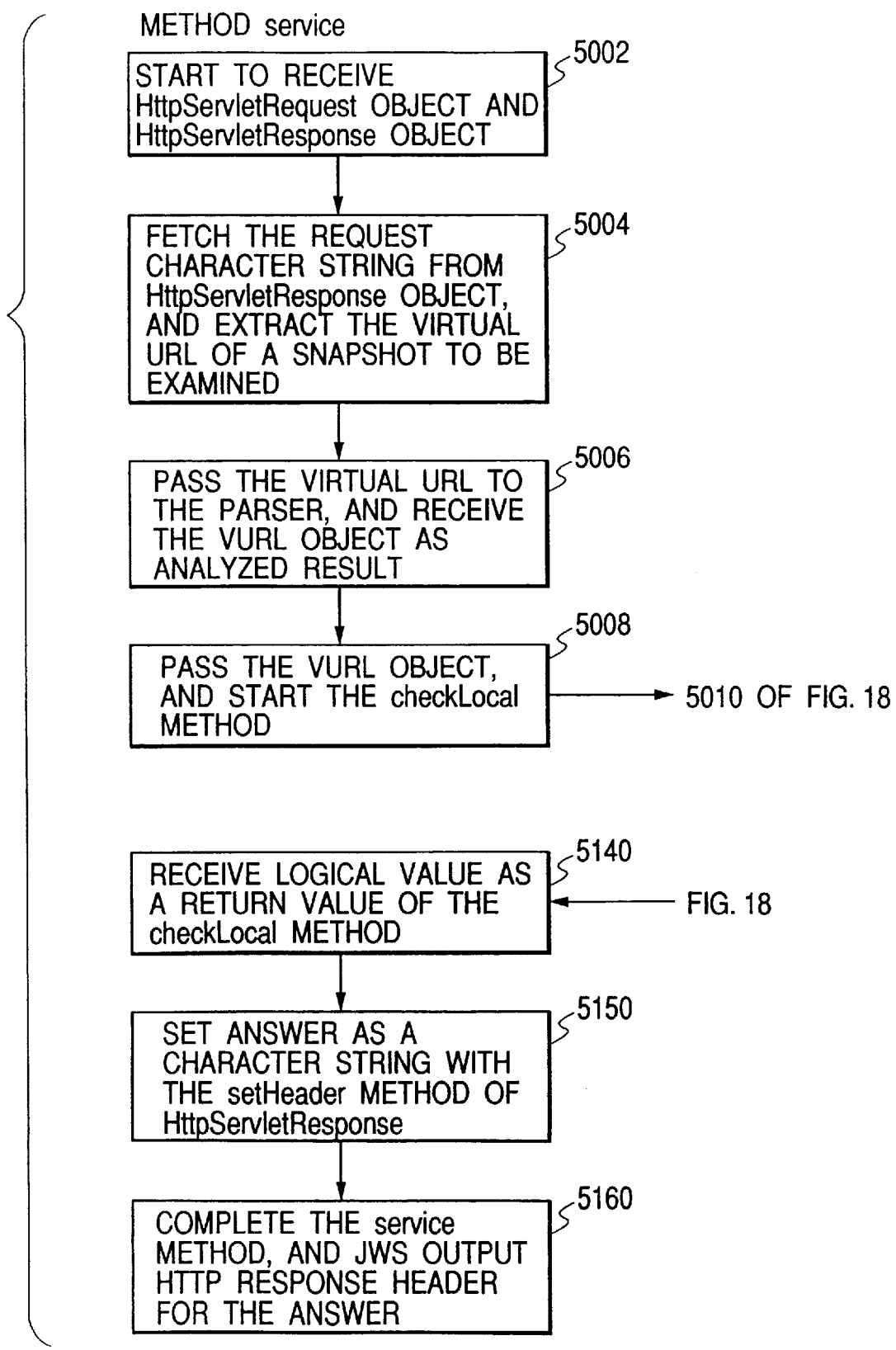
FIG. 17 is a chart to illustrate the operational flow (No. 1) of the snapshot manager in Embodiment 5 of the distributed file processor relating to the present invention.
Figure 18:
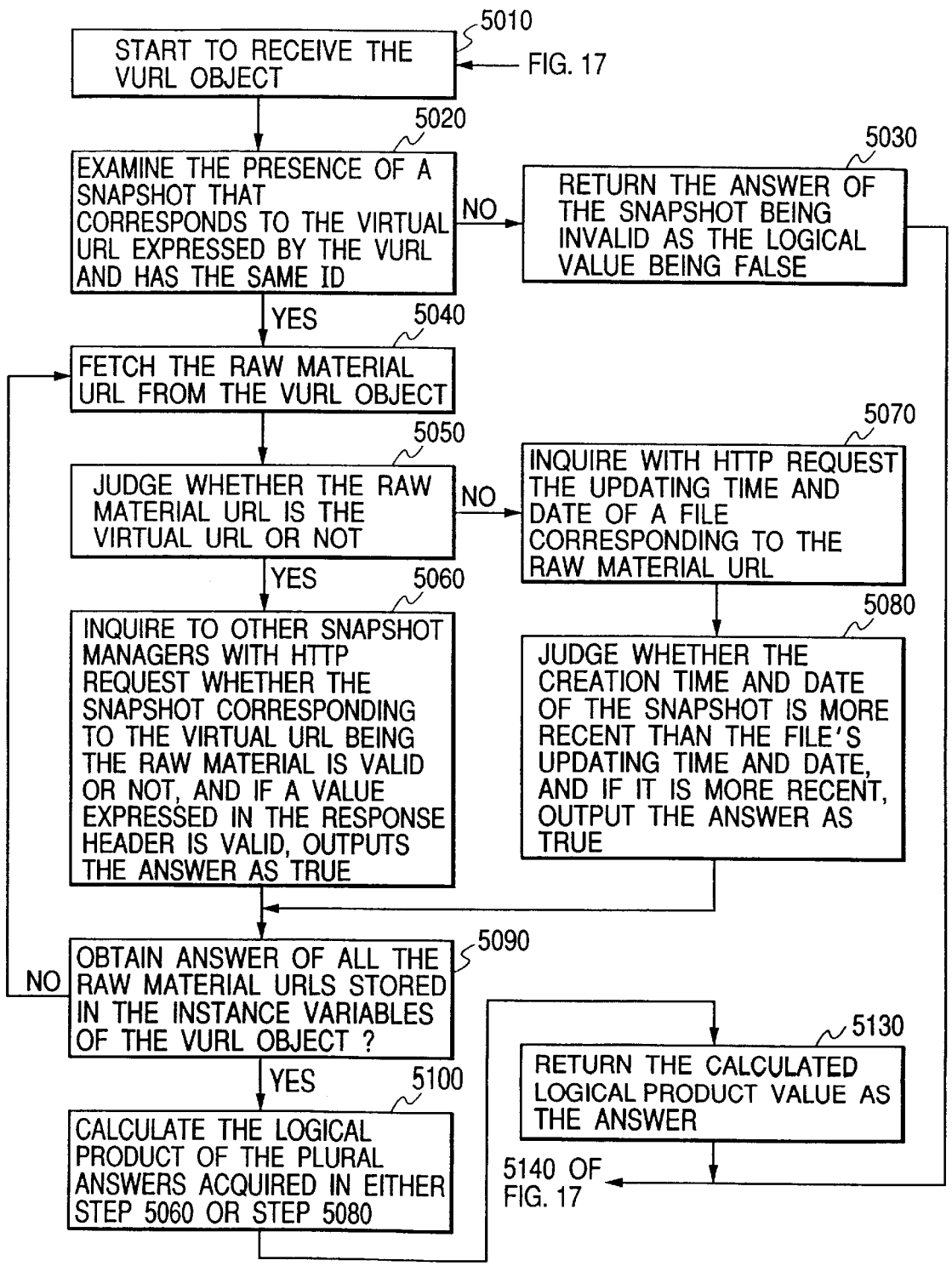
FIG. 18 is a chart to illustrate the operational flow (No. 2) of the snapshot manager in Embodiment 5 of the distributed file processor relating to the present invention.

In step 3030, the VURL 1111 (obj) is generated by analyzing the virtual URL 1111 using the URL parser 1611 which operates with the procedure shown in FIG. 17 and FIG. 18.

In step 3032, whether the VURL 1111 possesses the ID information or not is examined. If there is no ID attached to the virtual URL 1111, the step proceeds to step 3034.

In step 3034, an identifier ID1 unique to the request from the browser is generated and added to the VURL 1111 (obj).

In step 3035, whether the URL of the raw material fetched from the virtual URL 1111 is a virtual URL or not is examined. If determined as a virtual URL, in step 3052, the ID 1 associated with the original virtual URL 1111 is added to the URL of the raw material. Since the URL of the raw material fetched from the virtual URL is not a virtual URL, the step proceeds to step 3054.

In step 3054, the HTTP request is sent to the URL of the raw material stored in the instance variable of the VURL 1111 (obj) to acquire the file of the raw material.

In step 3060, whether all the raw material files have been acquired or not is examined. If not, the step returns to step 3050.

In step 3070, the method designated by the class name and method name stored in the instance variable of the VURL object is started using the acquired file as an argument and an object is generated with the return value as the process result.

In step 3080, the object of the process result is stored in the above mentioned hash table with the virtual URL as a key.

In step 3090, the object of the process result is written into the ServletOutputStream.

When the client uses the virtual URL with an ID added to send another request, the context, in step 3032 in FIG. 14, proceeds to step 3040 because of the added ID. In step 3040, the context passes the VURL object to the snapshot manager and inquires whether the snapshot corresponding to the virtual URL and the ID is valid or not.

When there is a valid snapshot, in step 3100, the snapshot object is fetched from the hash table.

In step 3110, the object is written into the ServletOutputStream.

Figure 16:
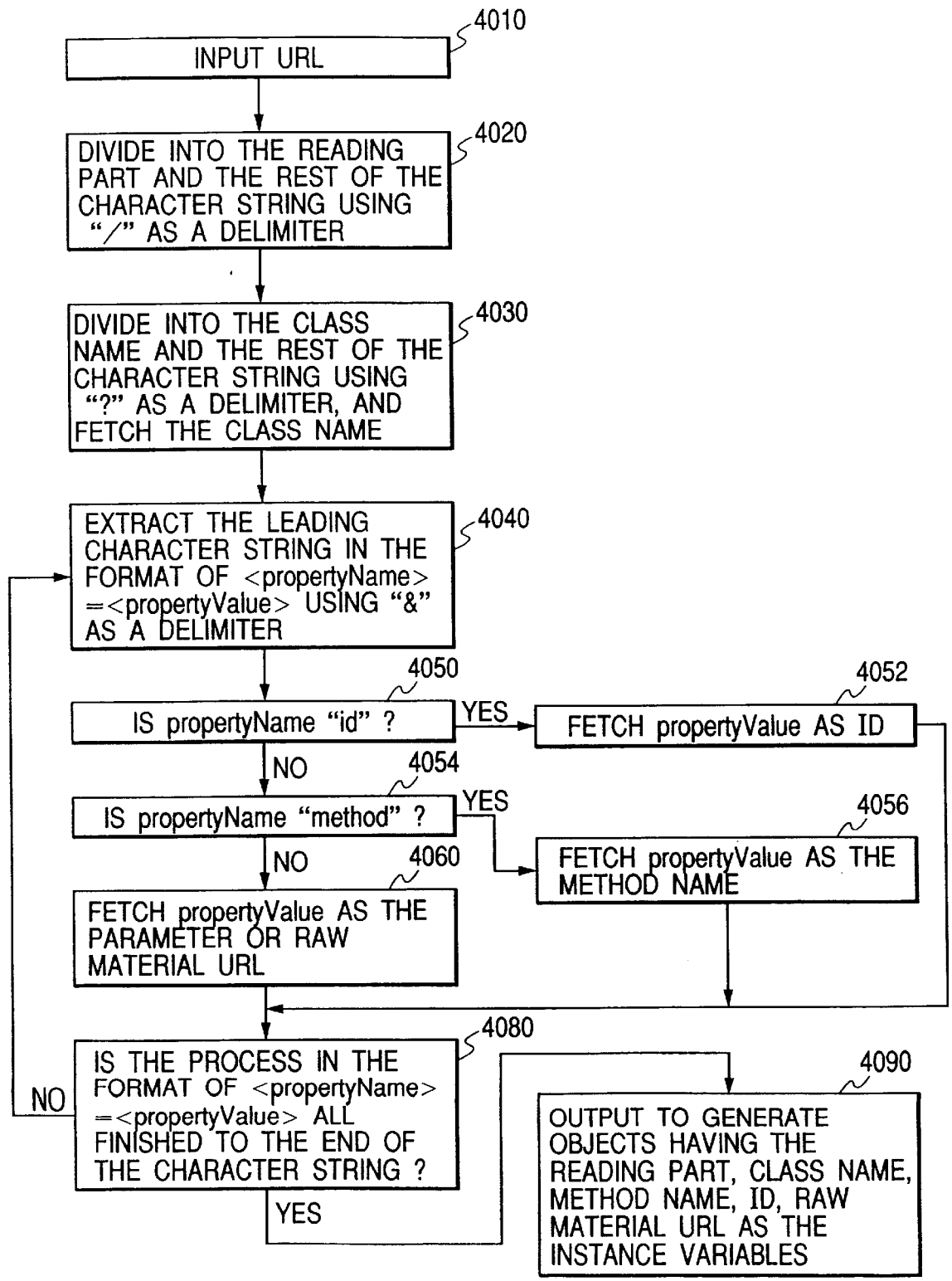
FIG. 16 is a chart to illustrate the operational flow of the URL parser in Embodiment 5 of the distributed file processor relating to the present invention.

The URL parsers operate in accordance with the operational flow shown in FIG. 16. The difference from the operational flow (refer to FIG. 5) of the URL parser explained in Embodiment 1 lies in the point that steps 4050 and 4052 in FIG. 16 are added, and the ID is added to the output configuration of step 4090.

The explanation of the operation from step 4010 to 4040 will be omitted since it is identical to that of Embodiment 1. In step 4050, the judgment is made as to whether the propertyName is id or not with regard to the fetched character string in the format of <propertyName>= <propertyValue>. If the judgment is Yes, the ID being the value of propertyvalue is fetched in step 4052.

The operation in the following steps 4054 through 4080 are identical to those of Embodiment 1. In step 4090, the object of the VURL class expressing the virtual URL is generated, and the class name Edit, method name summary, ID, and URL of the raw material are set as the values of the instance variable.

The snapshot managers operate in accordance with FIG. 17 and FIG. 18. The difference from the operation of the snapshot managers in Embodiment 1 lies in the point that, in step 5020, the validity of the snapshots is determined based on whether or not there is a snapshot object of which the virtual URL coincides with the ID.

In terms of the detail of the embodiment, the realization is possible using methods other than those that have been described. The method for transmitting the ID information form the server to the client is not limited to description in the HTML pages. It may be realized by including the information of the virtual URL having an ID added in the header of the HTTP response and passing it to the client.

As for generating the ID, it may be done by using the time and the host name of the server. By using the virtual URL with an ID added when the client sends the request, the object generated by a specific request can be acquired.

With the procedure described in this embodiment, the object can be acquired again by holding the result of the process at a specific point of time in the server and specifying it.

Embodiment 6

Next, as the sixth embodiment, a configuration acquiring an object of a plurality of the snapshot objects held in the server by specifying the range of generation time will be discussed.

The operation of the context follows the same procedure as in Embodiment 1, but it differs in the point that the time is recorded at the generation of the process result and held along with the snapshot object.

Figure 19:
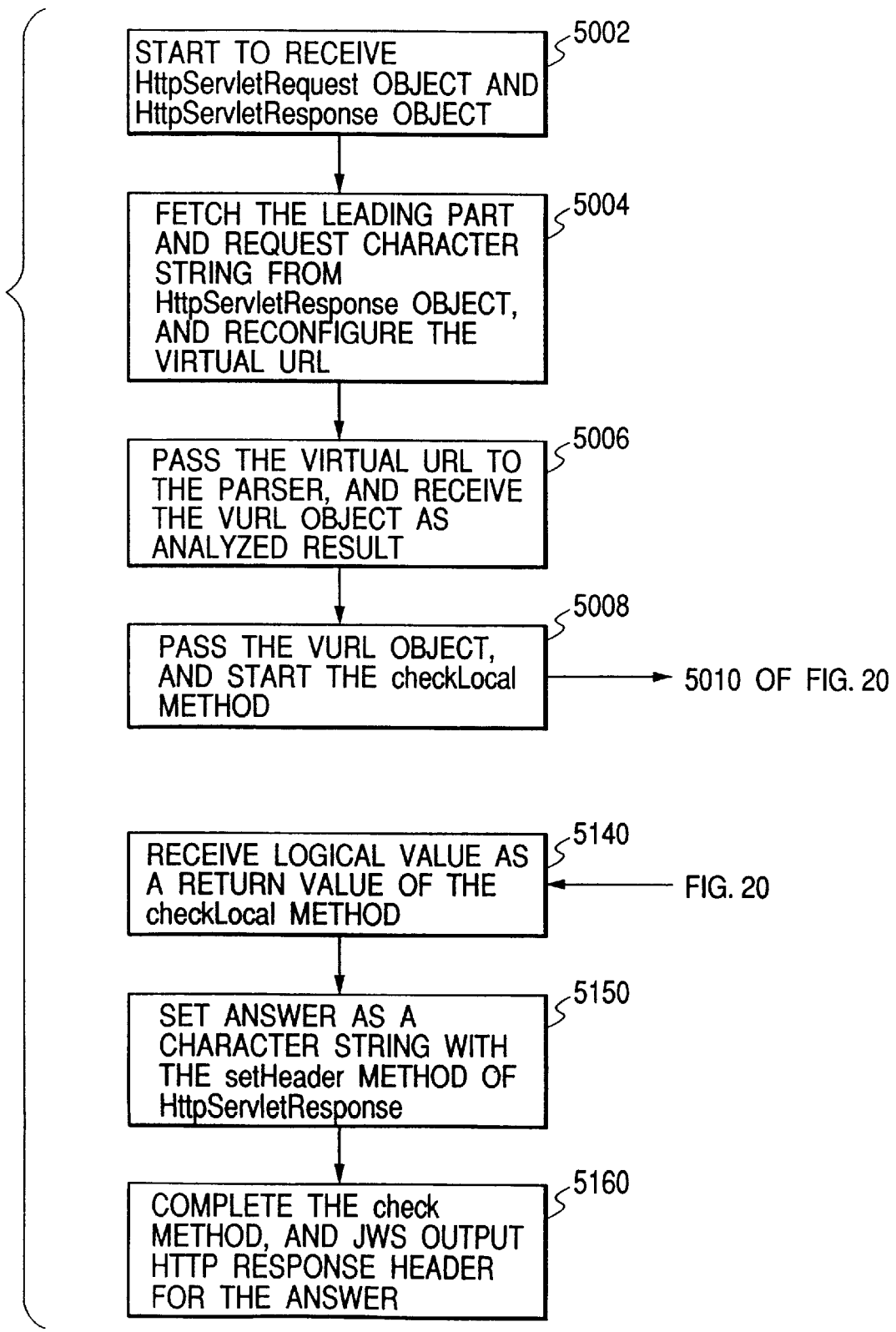
FIG. 19 is a chart to illustrate the operational flow (No. 1) of the snapshot manager in Embodiment 6 of the distributed file processor relating to the present invention.
Figure 20:
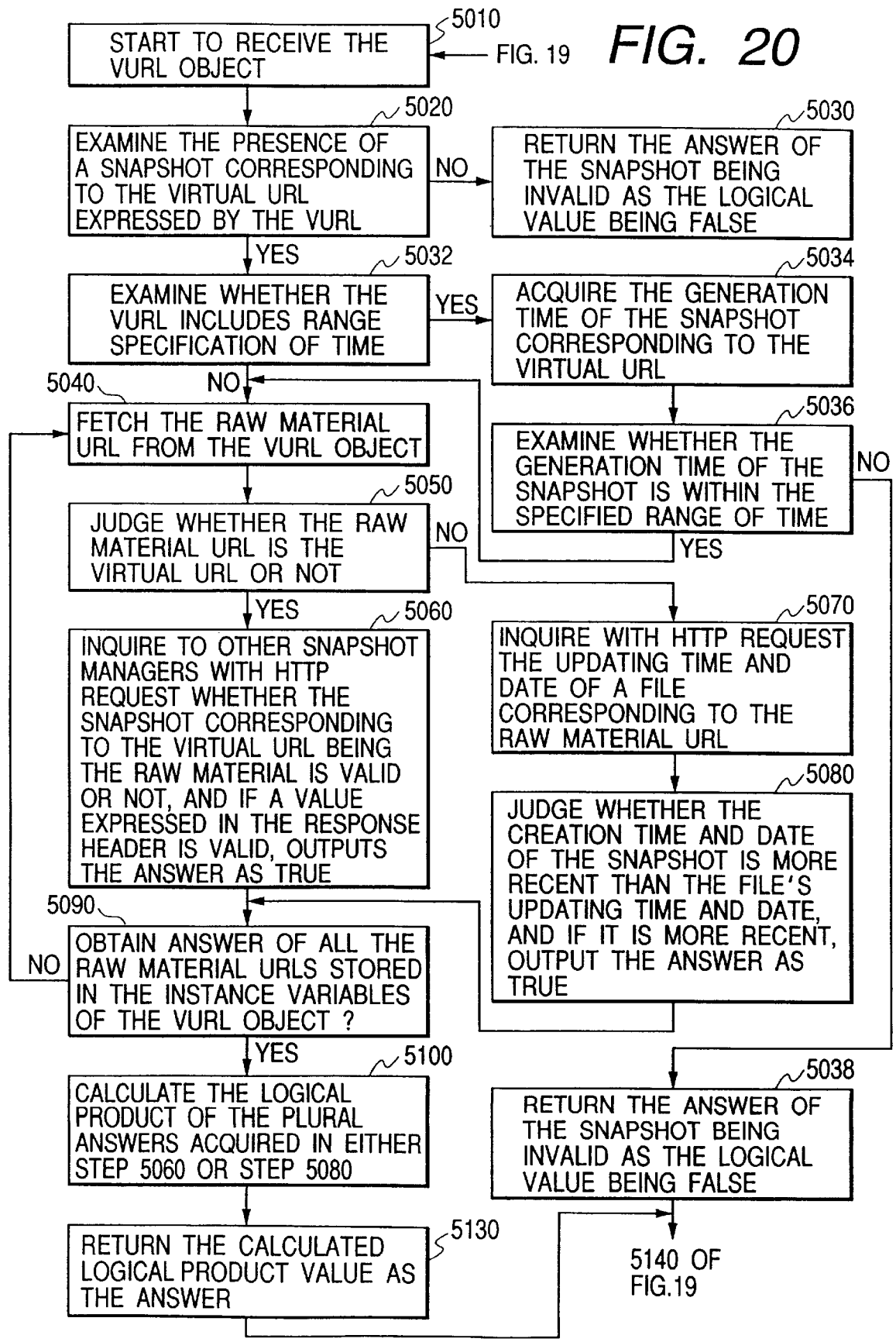
FIG. 20 is a chart to illustrate the operational flow (No. 2) of the snapshot manager in Embodiment 6 of the distributed file processor relating to the present invention.

The operational flow of the snapshot manager is shown in FIG. 19 and FIG. 20. In FIG. 19 and FIG. 20, the snapshot manager examines whether the range of generation time of the snapshot object is specified in the virtual URL or not, and if it is specified, the snapshot manager acquires the generation time of the snapshot object in step 5034, and in step 5036, judges whether that time is within the specified range of time. If it is not within the range, the result of the snapshot being invalid is returned in step 5038. The addition of these steps is what makes the operation of the snapshot manager different from the operation in Embodiment 1. If the range of time is not specified, it operates in the same manner as in Embodiment 1.

As an example of specifying the range of time, the UTC (Coordinated Universal Time) time is expressed with numbers counted in millisecond unit from the year 1970. And, the range of time, for example, 895809110000 to 895809120000 is described in the query character string of the virtual URL as ftime=895809110000&ttime= 895809120000. The URL parser treats this character string in the same manner as the operation mentioned above, and recognizes and interprets the specified time.

Thus, in the use of the snapshot, it becomes possible to make designation of a certain range of time in stead of making accurate designation of the generation time, or to make designation of starting a process to generate a new result.

Also, instead of using the generation time, by holding a parameter that expresses the character of a snapshotted object, and which can be expressed by means of a numeric value associated with the snapshot object, the designation of a condition that the snapshot be utilized if the value is within a range can be made in accordance with the same procedure.

Embodiment 7

Next, as the seventh embodiment, a configuration that asynchronously generates a process result started by the context will be discussed. The system that operates in the same procedure as in Embodiment 5 is used. However, the call format for the procedure can be specified in the virtual URL, and the call can be specified as asynchronous. As an example of a method to specify it, &invoke=async is specified in the URL query, and an URL such as http:// host1:8080/context/Edit?method=summary&invoke= async&u rl1=http%3A%2Fhost0%2Fpage01.html is used.

Figure 21:
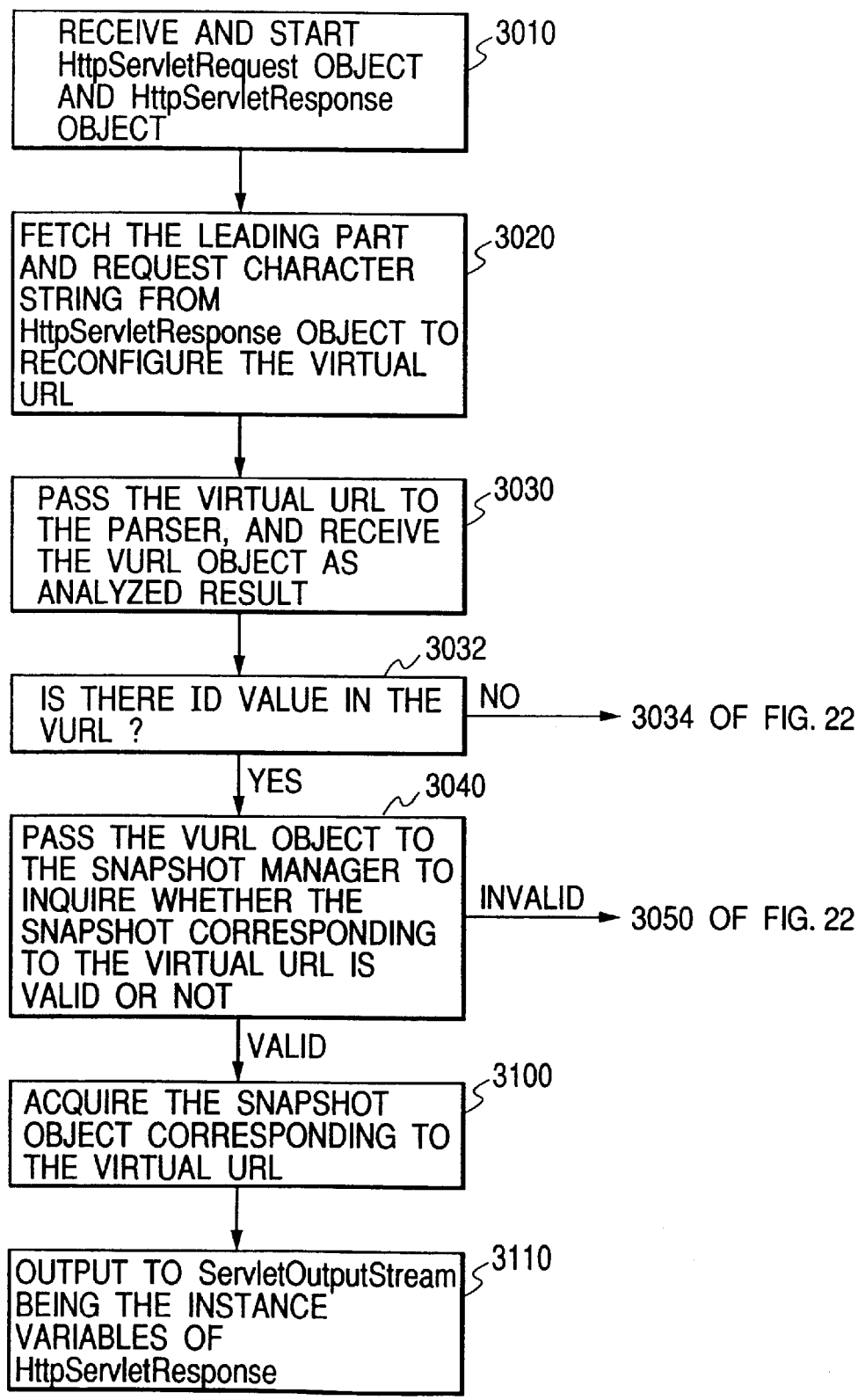
FIG. 21 is a chart to illustrate the operational flow (No. 1) of the context in Embodiment 7 of the distributed file processor relating to the present invention.
Figure 22:
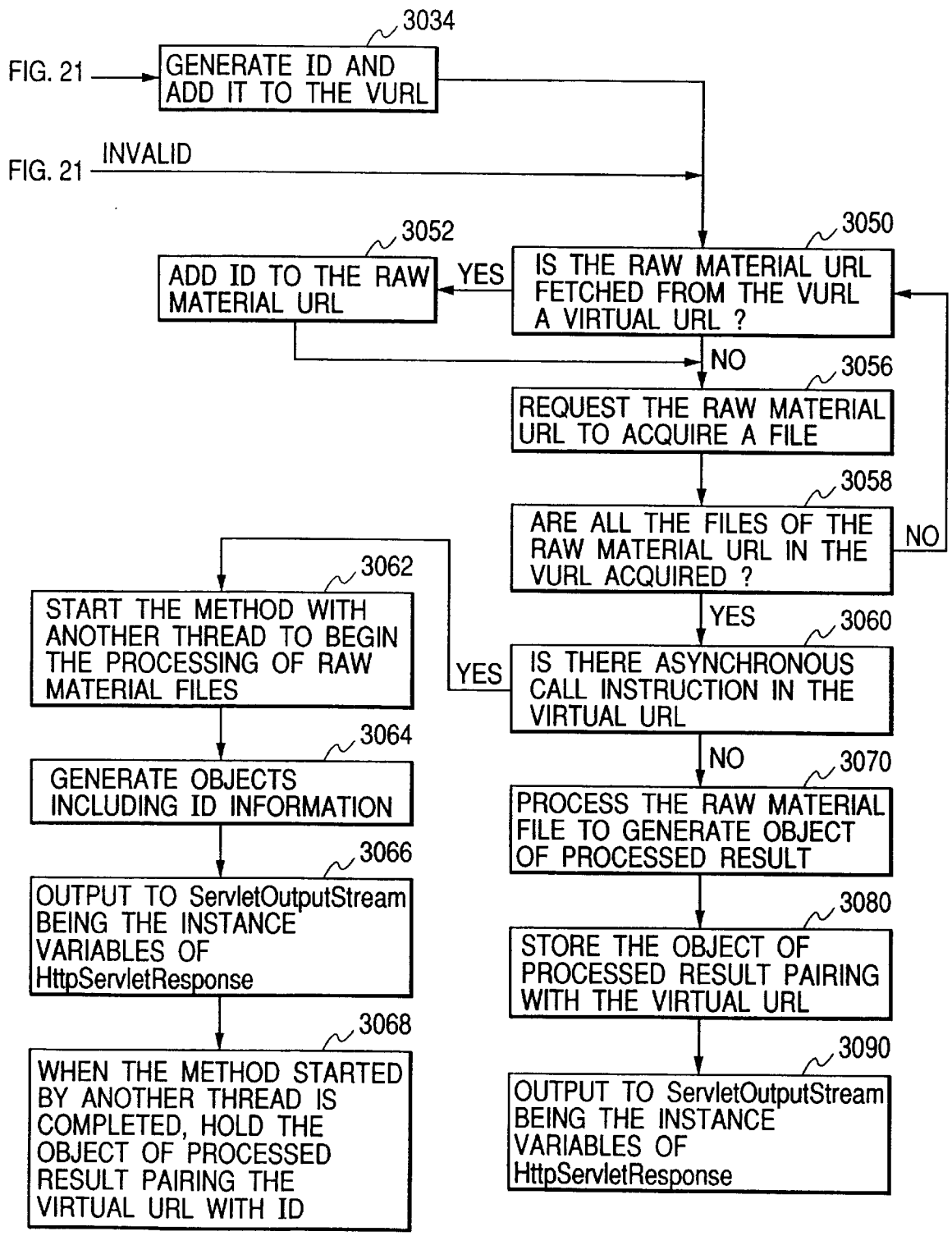
FIG. 22 is a chart to illustrate the operational flow (No. 2) of the context in Embodiment 7 of the distributed file processor relating to the present invention.

The context operates in accordance with FIG. 21 and FIG. 22. In step 3060, whether an asynchronous call is specified in the virtual URL is examined. If it is specified, the context acquires the raw material and starts the procedure with a different thread in step 3062. Next, in step 3064, the information including an ID corresponding to the result object outputted to the client is generated. To output the ID to the client, a method can be utilized which describes the ID in the HTML page as a hyperlink. Next, in step 3066, the generated information is outputted, and the HTTP access is terminated to disconnect the connection.

After the termination of the process with the different thread mentioned above, the result object is held pairing the virtual URL with the ID in step 3068. Other than the steps 3060 through 3068 mentioned above, the context operates in the same manner as in Embodiment 5.

The WWW client or other contexts can receive an ID and terminate the access of the HTTP, moving on to other processes. Then, as explained in Embodiment 5, making an HTTP request by adding the ID to the virtual URL allows the acquisition of the process result if the generation process of the snapshot in the processing server is terminated at that point.

In the other embodiments described previously, the connection with the WWW client is maintained until the call process is terminated and the result is generated, and the client was required to standby the output data all through that time, not being able to work on anything else. But in this example, it is possible for the calling party of the process to work on something else in parallel when the process takes time to terminate.

The snapshot generated by a process having been executed is associated with an ID, which is held in the processing server.

And, the client will be able to acquire the data in which a process is requested precedently through a new HTTP request with an ID added, by the identification with the ID.

Embodiment 8

Next, as the eighth embodiment of the present invention, a configuration will be explained, in which the context of the processing server alters the condition designated by the client at the time of the request, which is described in the virtual URL, searches a snapshot that can be the alternative for the data requested by the client, and outputs the snapshot.

In this embodiment, the configuration uses the system which operates in the same procedure as in Embodiment 5. However, when the snapshot corresponding to the specified ID and the virtual URL does not exist, it looks for a snapshot with different ID but corresponding to the same virtual URL, and when a valid snapshot is found, it outputs the snapshot to the client.

The context operates in the same manner as in Embodiment 5, following FIG. 14 and FIG. 15. In step 3040, the validity of the snapshot corresponding to the virtual URL and the ID is inquired to the snapshot manager.

Figure 23:
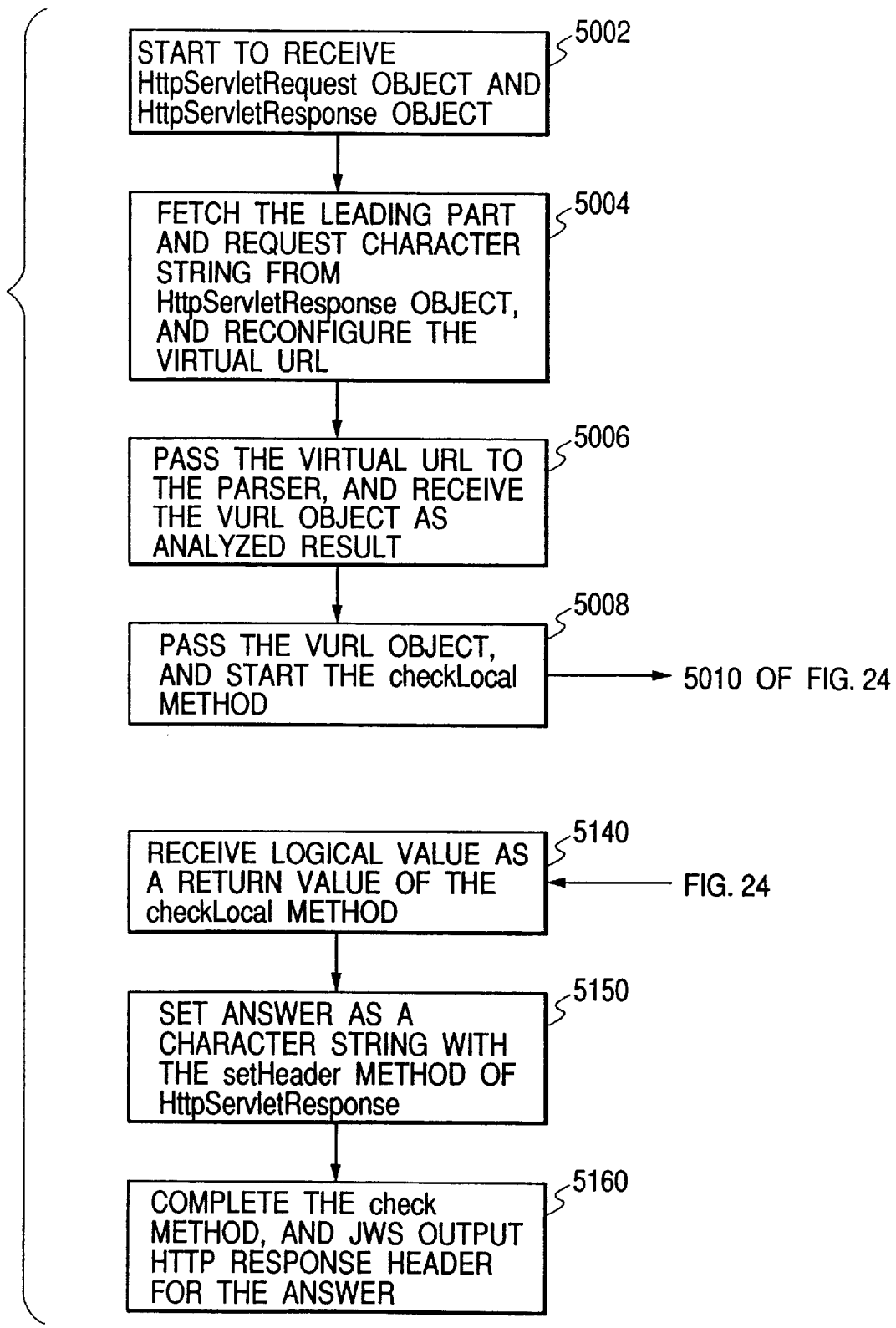
FIG. 23 is a chart to illustrate the operational flow (No. 1) of the snapshot manager in Embodiment 8 of the distributed file processor relating to the present invention.
Figure 24:
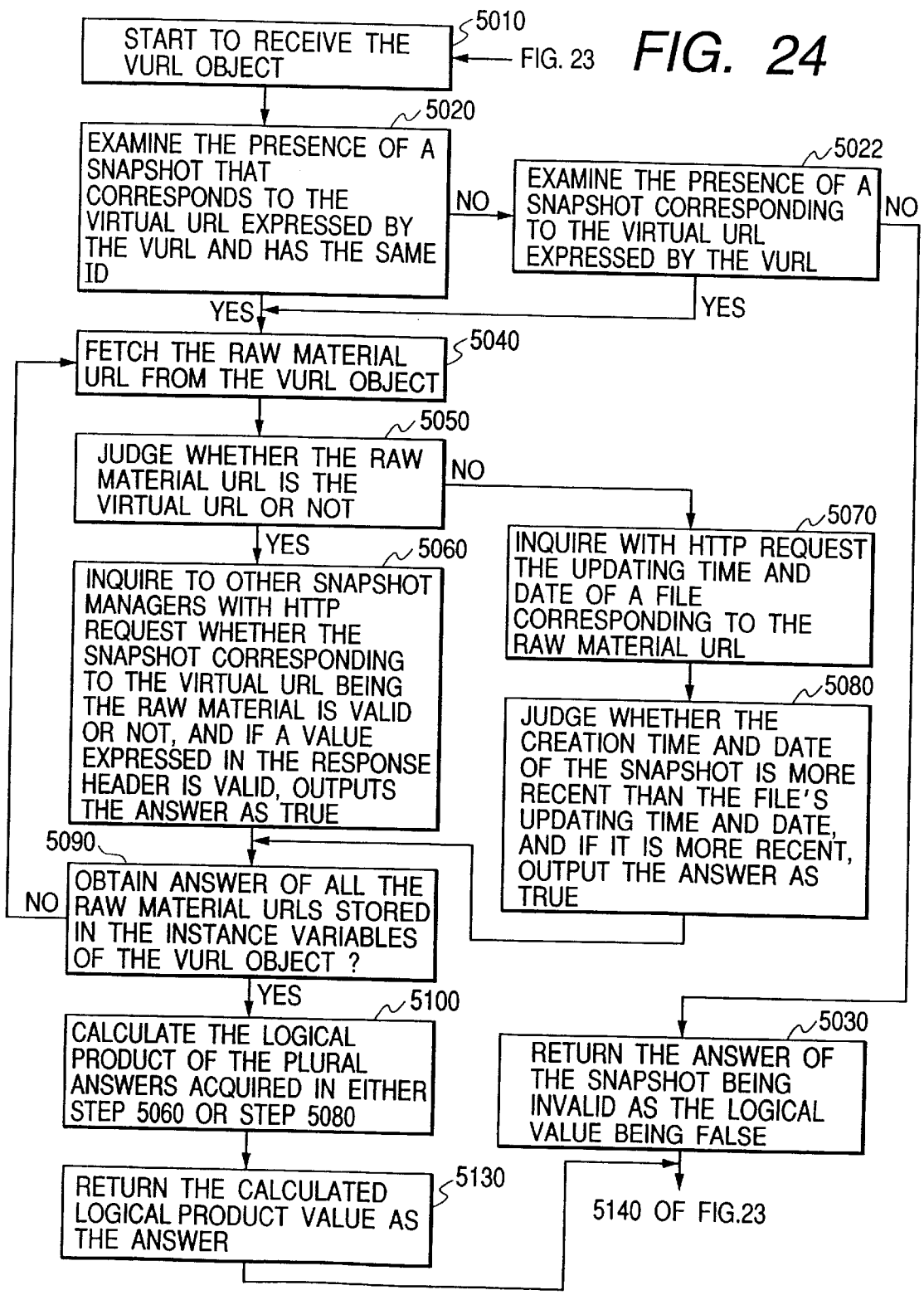
FIG. 24 is a chart to illustrate the operational flow (No. 2) of the snapshot manager in Embodiment 8 of the distributed file processor relating to the present invention.

The operation of the snapshot manager is as shown in FIG. 23 and FIG. 24, and it operates in the same manner as in Embodiment 5, except for some points that are described below. In step 5020, when the snapshot corresponding to the virtual URL and the ID does not exist, the step proceeds to step 5022 to examine whether or not there are snapshots in which only the virtual URL coincides. If not, the step proceeds to step 5030, returning the result of the snapshot being invalid as "false" of the logical value. If the snapshot exists, the step proceeds to step 5040, determining the validity of the snapshot in the same manner as in Embodiment 5. But in this case, the candidate snapshot is the one examined in step 5022, in which only the virtual URL coincides, having no guarantee of coincidence with the ID.

The operation of the snapshot manager in step 5022 in FIG. 23 and FIG. 24 is not limited to searching the snapshot that does not coincide with the ID as an alternative as mentioned above. It is possible, for example, to either cancel or extend a specified range for the virtual URL with a specified range as described in Embodiment 5.

In the aforementioned Embodiment 5, the snapshots could not be used unless both the virtual URL and the ID coincided. But through the procedure of this embodiment, the request of the users can be satisfied who would prefer to utilize the snapshot objects with the ID coincided, but would like to acquire an alternate object when it does not exist.

The Effect of the Invention

As explained above, the distributed file processor and the distributed file processing method of the present invention contain: the context unit that implements a process based on the virtual URL configured by qualifying a raw material file name with the procedure name representing a procedure to edit and process a raw material, the parameter of the procedure, the name of the computer that interprets the procedure name and operates the procedure, and the context name that determines the operational environment, etc.; the result holding unit that holds a process result of the raw material file processed by the context unit; and the result control unit that judges the validity of the process result held by the result holding unit. Thanks to this construction, it becomes possible to execute the validity judgment of the process result held in the result holding unit, and to output a valid process result by swift extraction in response to a request.

Further, the distributed file processor and the distributed file processing method of the present invention enables the validity judgment of the process result based on the identification data of the raw material file name and the procedure name etc., the identification data of the process time and date indicating the time and date at which the procedure is processed, and the identification data of the process request unique to each request for processing the procedure, and thereby, the validity judgment of a process result can be materialized with high level of reliability.

Also, since the distributed file processor and the distributed file processing method of the present invention contain the configuration of a plurality of the context units, result holding units, and result control units connected to a network, it is possible to inquire the validity of a process result to the result control unit to control other process result holding units on the network which hold the process results corresponding to the raw material files and procedures specified by the process request, whereby effective use of the resources on the network can be achieved.

And, in the distributed file processor and the distributed file processing method of the present invention, since the procedure process of the raw material file in the context unit can be executed as an asynchronous process independent from the timing of a process request, it becomes possible to fetch a process result and accurately execute the output by generating the identifier corresponding to the process result and holding it in the result holding unit.

Furthermore, according to the distributed file processor and the distributed file processing method of the present invention, since the configuration is made to output the process result with partial correspondence when the result holding unit includes the process result that does not correspond completely with the qualified file name of the request but corresponds partially, a system capable of quickly responding to the client's request can be provided.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A distributed file processor in a distributed computer system with computers connected through a network, comprising:

a context unit that interprets a qualified file name configured by qualifying a raw material file name identifiable of a data file raw material held in the processor connected to said network with a procedure name representing a procedure to edit and process the raw material, a parameter of the procedure, the name of a computer that interprets the procedure name and operates the procedure, and a context name that defines operational environments, fetches the raw material file name and the procedure name, inputs data of a raw material file corresponding to the fetched raw material file name, starts a procedure corresponding to said fetched procedure name, and implements a process by said procedure having started the raw material file;

a process result holding unit that holds a process result of the raw material file processed by said procedure started by the context unit;

a result outputting unit that outputs to fetch said process result held by said process result holding unit; and a process result control unit that judges the validity of the process result held by said process result holding unit, wherein the process result control unit comprises a configuration that judges the validity of said process result on the basis of the raw material file name corresponding to the process result held by said process result holding unit and the procedure name executed in said context unit.

2. The distributed file processor according to claim 1, wherein said process result control unit comprises a configuration that judges the validity of said process result on the basis of either a process execution date and time of the procedure process by said context unit, or a process request identifier inherent to a request that demanded to execute the procedure process by said context unit.

3. The distributed file processor according to claim 1, wherein said process result control unit comprises a configuration that compares an updating date and time of said raw material file with a process execution date and time of the procedure process by said context unit, and judges the validity of said process result on the basis of said comparison result.

4. The distributed file processor according to claim 2, wherein, when said context unit judges that a process time specifier of the requested process result is included in the interpretation of said qualified file name, said process result control unit comprises a configuration that judges the validity of the process result associated with said process date and time on the basis of whether or not said process date and time corresponds to a rage of time indicated by said process time specifier.

5. The distributed file processor according to claim 1, wherein:

said network comprises a configuration that connects a plurality of context units, a plurality of process result holding units provided correspondingly to said plurality of context units, and a plurality of process result control units provided correspondingly to said plurality of process result holding units, in which a plurality of the context units are each capable of the procedure process individually, and a first process result control unit that judges the validity of the process result corresponding to a process request outputted on the network comprises a configuration that executes a query as for the validity of the process result to a second process result control unit that controls a second process result holding unit on the network which holds the process result corresponding to the raw material file and the procedure specified by said process request.

6. The distributed file processor according to claim 1, wherein said process result control unit comprises a configuration that executes a process of either invalidation or cancellation of the process result stored in said process result holding unit, on the condition of the analysis that a specific parameter indicating a designation of either invalidation or cancellation of the process result held in said process result holding unit is included in the interpretation of the qualified file name by said context unit.

7. The distributed file processor according to claim 6, wherein, accompanied with the execution of a process by said process result control unit, which relates to either invalidation or cancellation of the process result stored in said process result holding unit, said context unit comprises a configuration that acquires the raw material file corresponding to said process result in which the invalidation or cancellation has been executed, and executes a new process to hold a process result thereof in said process result holding unit.

8. The distributed file processor according to claim 1, wherein a process according to said procedure to the raw material file in said context unit is executed as an asynchronous process independent from the timing of a process request, a process result identifier is generated to a process result processed by said procedure, which corresponds to the process result, and said process result identifier is held in said process result holding unit to be associated with the process result.

9. The distributed file processor according to claim 8, wherein said context unit comprises a configuration that executes said procedure to the raw material file as an asynchronous process independent from said timing of a process request, on the condition of the judgment that a specifying data indicating the process request being asynchronous is included in the interpretation of said qualified file name.

10. The distributed file processor according to claim 1, wherein, when said context unit judges that a process result that does not completely coincide but partially coincides with a condition of a process request is included in said process result holding unit in the interpretation of said qualified file name, said result output unit comprises a configuration that outputs the process result having the partial coincidence included in said process result holding unit.

11. A distributed file processing method in a distributed computer system with computers connected through a network, comprising:

a procedure processing step by a context unit that interprets a qualified file name configured by qualifying a raw material file name identifiable of a data file raw material held in the processor connected to said network with a procedure name representing a procedure to edit and process the raw material, a parameter of the procedure, the name of a computer that interprets the procedure name and operates the procedure, and a context name that defines operational environments, fetches the raw material file name and the procedure name, inputs data of a raw material file corresponding to said fetched raw material file name, starts a procedure corresponding to said fetched procedure name, and implements a process by said procedure having started the raw material file;

a result holding step that holds in the process result holding unit a process result of the raw material file processed by said procedure started in said procedure processing step;

a process result validity judgment step that judges the validity of the process result held by said process result holding unit; and a result outputting step that outputs to fetch the process result held by said process result holding unit, which is the process result that is judged as valid in said process result validity judgment step, wherein said process result validity judgment step comprises a step that judges the validity of said process result on the basis of said raw material file name corresponding to the process result held by said process result holding unit and the procedure name executed in said context unit.

12. The distributed file processing method according to claim 11, wherein said process result validity judgment step comprises a step that judges the validity of said process result on the basis of either a process execution date and time of the procedure process by said context unit, or a process request identifier inherent to a request that demanded to execute the procedure process by said context unit.

13. The distributed file processing method according to claim 11, wherein said process result validity judgment step comprises a step that compares an updating date and time of said raw material file with a process execution date and time of the procedure process by said context unit, and judges the validity of the process result on the basis of the comparison result.

14. The distributed file processing method according to claim 11, wherein, in said context unit, a process by the procedure to the raw material file is executed as an asynchronous process independent from the timing of a process request, a process result identifier is generated to a process result processed by said procedure, which corresponds to said process result, and said process result identifier is held in said process result holding unit to be associated with the process result.

* * * * *